(12) United States Patent
Poplack et al.

(10) Patent No.: US 7,721,036 B2
(45) Date of Patent: May 18, 2010

(54) SYSTEM AND METHOD FOR PROVIDING FLEXIBLE SIGNAL ROUTING AND TIMING

(75) Inventors: Mitchell G. Poplack, San Jose, CA (US); John A. Maher, San Jose, CA (US)

(73) Assignee: Quickturn Design Systems Inc., San Jose, CA (US)

(*) Notice: Subject to any disclaimer, the term of this patent is extended or adjusted under 35 U.S.C. 154(b) by 216 days.

(21) Appl. No.: 11/140,714

(22) Filed: May 31, 2005

(65) Prior Publication Data

US 2005/0267727 A1 Dec. 1, 2005

Related U.S. Application Data

(60) Provisional application No. 60/576,611, filed on Jun. 1, 2004, provisional application No. 60/576,691, filed on Jun. 1, 2004.

(51) Int. Cl.
*G06F 13/14* (2006.01)
*G06F 13/36* (2006.01)
*G06F 13/00* (2006.01)
*G06F 9/455* (2006.01)

(52) U.S. Cl. .................. 710/305; 710/31; 710/306; 703/25

(58) Field of Classification Search ................ 710/305, 710/306, 31; 703/25
See application file for complete search history.

(56) References Cited

U.S. PATENT DOCUMENTS

| 5,109,353 | A | 4/1992 | Sample et al. | ............... 364/578 |
| 5,126,966 | A | 6/1992 | Hafeman et al. | ............ 364/500 |

(Continued)

FOREIGN PATENT DOCUMENTS

GB 2439579 A * 1/2008

(Continued)

OTHER PUBLICATIONS

"1.4 System Timing", 2000, Webster Art of Assembly, retrieved from the Internet on Nov. 5, 2008 at http://webster.cs.ucr.edu/AoA/Linux/HTML/SystemOrganizationa4.html, p. 1.*

(Continued)

*Primary Examiner*—Mark Rinehart
*Assistant Examiner*—Faisal M Zaman
(74) *Attorney, Agent, or Firm*—Orrick, Herrington & Sutcliffe LLP

(57) ABSTRACT

A target interface system for flexibly routing and timing communication signals exchanged between selected components of a communication system and methods for manufacturing and using same. Under the control of a host system, the target interface system samples an output data signal provided by the host system and includes a reconfigurable datapath for flexibly routing the sampled data signal to a selected target I/O pin of the target interface system. The selected target I/O pin provides the sampled data signal as an outgoing target data signal to a target system and likewise receives an incoming target data signal from the target system. Upon sampling the incoming target data signal, the target interface system flexibly routes the sampled data signal to the host system as an input data signal. The target interface system thereby facilitates exchanges of communication signals between the host system and the target system.

35 Claims, 13 Drawing Sheets

U.S. PATENT DOCUMENTS

| | | | | |
|---|---|---|---|---|
| 5,377,124 | A | | 12/1994 | Mohsen ................... 364/489 |
| 5,414,638 | A | | 5/1995 | Verheyen et al. ........... 364/489 |
| 5,475,830 | A | | 12/1995 | Chen et al. ................. 395/500 |
| 5,544,069 | A | | 8/1996 | Mohsen ................... 364/489 |
| 5,551,013 | A | | 8/1996 | Beausoleil et al. ........... 703/23 |
| 5,572,710 | A | * | 11/1996 | Asano et al. ................ 703/15 |
| 5,574,388 | A | | 11/1996 | Barbier et al. .............. 326/41 |
| 5,596,742 | A | | 1/1997 | Agarwal et al. ............ 395/500 |
| 5,649,176 | A | | 7/1997 | Selvidge et al. ............ 395/551 |
| 5,654,564 | A | | 8/1997 | Mohsen ................... 251/209 |
| 5,659,716 | A | | 8/1997 | Selvidge et al. ............ 395/500 |
| 5,748,875 | A | * | 5/1998 | Tzori ....................... 714/29 |
| 5,754,827 | A | | 5/1998 | Barbier et al. ............. 395/500 |
| 5,761,484 | A | | 6/1998 | Agarwal et al. ............ 395/500 |
| 5,771,181 | A | * | 6/1998 | Moore et al. .................. 703/7 |
| 5,777,489 | A | | 7/1998 | Barbier et al. .............. 326/40 |
| 5,790,832 | A | | 8/1998 | Barbier et al. ............. 395/500 |
| 5,802,348 | A | | 9/1998 | Stewart et al. ............. 395/500 |
| 5,812,414 | A | * | 9/1998 | Butts et al. .................. 716/16 |
| 5,822,564 | A | | 10/1998 | Chilton et al. ............. 395/500 |
| 5,838,948 | A | * | 11/1998 | Bunza ....................... 703/27 |
| 5,847,578 | A | | 12/1998 | Noakes et al. .............. 326/39 |
| 5,850,537 | A | | 12/1998 | Selvidge et al. ............ 395/500 |
| 5,854,752 | A | | 12/1998 | Agarwal ................... 364/489 |
| 5,884,066 | A | | 3/1999 | Kuijsten ................... 395/500 |
| 5,920,712 | A | | 7/1999 | Kuijsten ................... 395/500 |
| 5,940,603 | A | * | 8/1999 | Huang ........................ 716/5 |
| 5,963,736 | A | | 10/1999 | Sarno et al. ............. 395/500.48 |
| 6,020,760 | A | | 2/2000 | Sample et al. .............. 326/41 |
| 6,034,857 | A | | 3/2000 | Sample et al. ............ 361/93.2 |
| 6,035,117 | A | | 3/2000 | Beausoleil et al. ........... 703/25 |
| 6,051,030 | A | | 4/2000 | Beausoleil et al. ........... 703/20 |
| 6,058,492 | A | | 5/2000 | Sample et al. .............. 714/33 |
| 6,061,511 | A | * | 5/2000 | Marantz et al. .............. 703/28 |
| 6,223,148 | B1 | * | 4/2001 | Stewart et al. ............... 703/25 |
| 6,259,588 | B1 | | 7/2001 | Sample et al. ............ 361/93.2 |
| 6,285,211 | B1 | | 9/2001 | Sample et al. .............. 326/41 |
| 6,377,912 | B1 | | 4/2002 | Sample et al. ............... 703/28 |
| 6,618,698 | B1 | | 9/2003 | Beausoleil et al. ........... 703/23 |
| 6,681,377 | B2 | | 1/2004 | Beletsky ..................... 716/6 |
| 6,694,464 | B1 | | 2/2004 | Quayle et al. .............. 714/725 |
| 6,697,957 | B1 | | 2/2004 | Wang et al. ................ 713/401 |
| 6,842,729 | B2 | | 1/2005 | Sample et al. ............... 703/24 |
| 6,850,880 | B1 | | 2/2005 | Beausoleil et al. ........... 703/23 |
| 6,865,504 | B2 | * | 3/2005 | Larson et al. .............. 702/123 |
| 6,901,359 | B1 | | 5/2005 | Beausoleil et al. ........... 703/24 |
| 6,912,675 | B2 | * | 6/2005 | Swoboda .................... 714/45 |
| 6,922,794 | B2 | * | 7/2005 | Tagawa et al. ............... 714/28 |
| 7,031,903 | B2 | * | 4/2006 | Debling ...................... 703/27 |
| 7,093,051 | B2 | * | 8/2006 | Haig et al. ................. 710/305 |
| 7,440,866 | B2 | * | 10/2008 | Maher et al. ............... 702/120 |
| 7,640,155 | B2 | * | 12/2009 | Poplack et al. ............... 703/23 |
| 2002/0052729 | A1 | * | 5/2002 | Kyung et al. ................ 703/28 |
| 2004/0001432 | A1 | * | 1/2004 | Wescott ..................... 370/217 |
| 2004/0239635 | A1 | * | 12/2004 | Lerner et al. ............... 345/169 |
| 2005/0066088 | A1 | * | 3/2005 | Helfinstine et al. ........... 710/71 |
| 2005/0102125 | A1 | * | 5/2005 | Tseng ........................ 703/14 |

FOREIGN PATENT DOCUMENTS

| | | | |
|---|---|---|---|
| JP | 2000322281 A | * | 11/2000 |
| JP | 2005134983 A | * | 5/2005 |
| JP | 2007122597 A | * | 5/2007 |
| KR | 2009053670 A | * | 5/2009 |

OTHER PUBLICATIONS

Kim et al., "SmartGlue: an interface controller with auto reconfiguration for field programmable computing machine", Jan. 2004, IEEE Press, Proceedings of the 2004 Asia and South Pacific Design Automation Conference, Asia and South Pacific Design Automation Conference, pp. 734-736.*

Chang et al., "Implementation of BEE: a real-time large-scale hardware emulation engine", Feb. 2003, ACM, Proceedings of the 2003 ACM/SIGDA Eleventh international Symposium on Field Programmable Gate Arrays, pp. 91-99.*

Chung et al., "ProtoFlex: Towards Scalable, Full-System Multiprocessor Simulations Using FPGAs", Jun. 2009, ACM, ACM Trans. Reconfigurable Technol. Syst. vol. 2, Issue 2, pp. 1-32.*

Nakamura et al., "A fast hardware/software co-verification method for system-on-a-chip by using a C/C++ simulator and FPGA emulator with shared register communication", Jun. 2004, ACM, Proceedings of the 41st Annual Design Automation Conference, pp. 299-304.*

* cited by examiner

SYSTEM AND METHOD FOR PROVIDING FLEXIBLE SIGNAL ROUTING AND TIMING

CROSS-REFERENCE TO RELATED APPLICATIONS

This application claims priority to U.S. Provisional Application Ser. No. 60/576,611 and U.S. Provisional Application Ser. No. 60/576,691, each being filed on Jun. 1, 2004. Priority to these prior applications is expressly claimed, and the disclosures of respective applications are hereby incorporated by reference in their entireties.

FIELD

The present invention relates generally to hardware emulation systems for verifying electronic circuit designs and more particularly, but not exclusively, to interface systems for coupling such hardware emulation systems with other system components in emulation.

BACKGROUND

Emulation systems are used to verify electronic circuit designs prior to fabrication as chips or manufacture as electronic systems. Typical emulation systems utilize either interconnected programmable logic chips or interconnected processor chips. Examples of hardware logic emulation systems using programmable logic devices can be seen in, for example, U.S. Pat. Nos. 5,109,353, 5,036,473, 5,475,830 and 5,960,191. U.S. Pat. Nos. 5,109,353, 5,036,473, 5,475,830 and 5,960,191 are incorporated herein by reference. Examples of hardware logic emulation systems using processor chips can be seen in, for example, U.S. Pat. Nos. 5,551,013, 6,035,117 and 6,051,030. U.S. Pat. Nos. 5,551,013, 6,035,117 and 6,051,030 are incorporated herein by reference.

The design under verification (or test) ("DUV") is usually provided in the form of a netlist description of the design. The netlist may have been derived from many sources, including from a hardware description language. A netlist description (or "netlist" as it to by those of ordinary skill in the art) is a description of the circuit's components and electrical interconnections between the components. The components include all those circuit elements necessary for implementing a logic circuit, such as combinational logic (e.g., gates) and sequential logic (e.g., flip-flops and latches). In prior art emulation systems, the netlist is compiled such that it is placed in a form that can be used by the emulation system. In an FPGA-based emulator, the DUV is compiled into a form that allows the logic gates (both sequential and combinational) to be implemented in the FPGAs. In a processor-based emulation system, the DUV is compiled into a series of statements that will be executed by the processors on the processor chips. No logic is implemented into these processors.

Conventional hardware emulation systems include target interface systems for coupling with one or more user testbenches and/or target systems. A "target system" is, generally speaking, the actual operating environment that the DUV, once manufactured, will be installed. Thus, the target system for a microprocessor DUV can be a personal computer. A "testbench," in this context, is an application that may apply a set of stimuli (such as a test vector) to a model to produce a set of information used in analyzing the timing or performance of a system block. The target interface systems of these hardware emulation systems suffer from several limitations. For example, the input/output (I/O) technologies employed by such target interface systems are not suitable for supporting differential signaling technologies. Connection to a differential target system requires the use of additional technology conversion hardware, which generally must be custom made. The design under test thereby is required to expose a single logical signal as a primary I/O (as opposed to possibly two nets), requiring manual intervention into the netlist of the design.

Other disadvantages of the target interface systems of conventional hardware emulation systems include the use of fixed input/output (I/O) technologies. The target interface systems likewise provide limited I/O timing control as well as a limited number of directional signals for bidirectional signals. Further, conventional target interface systems cannot verify the validity of the I/O voltage of the target system and are unable to detect whether the target system is powered on, powered off, or unconnected.

In view of the foregoing, a need exists for an improved hardware emulation system that overcomes the aforementioned obstacles and deficiencies of currently-available hardware emulation systems.

Figure 1:
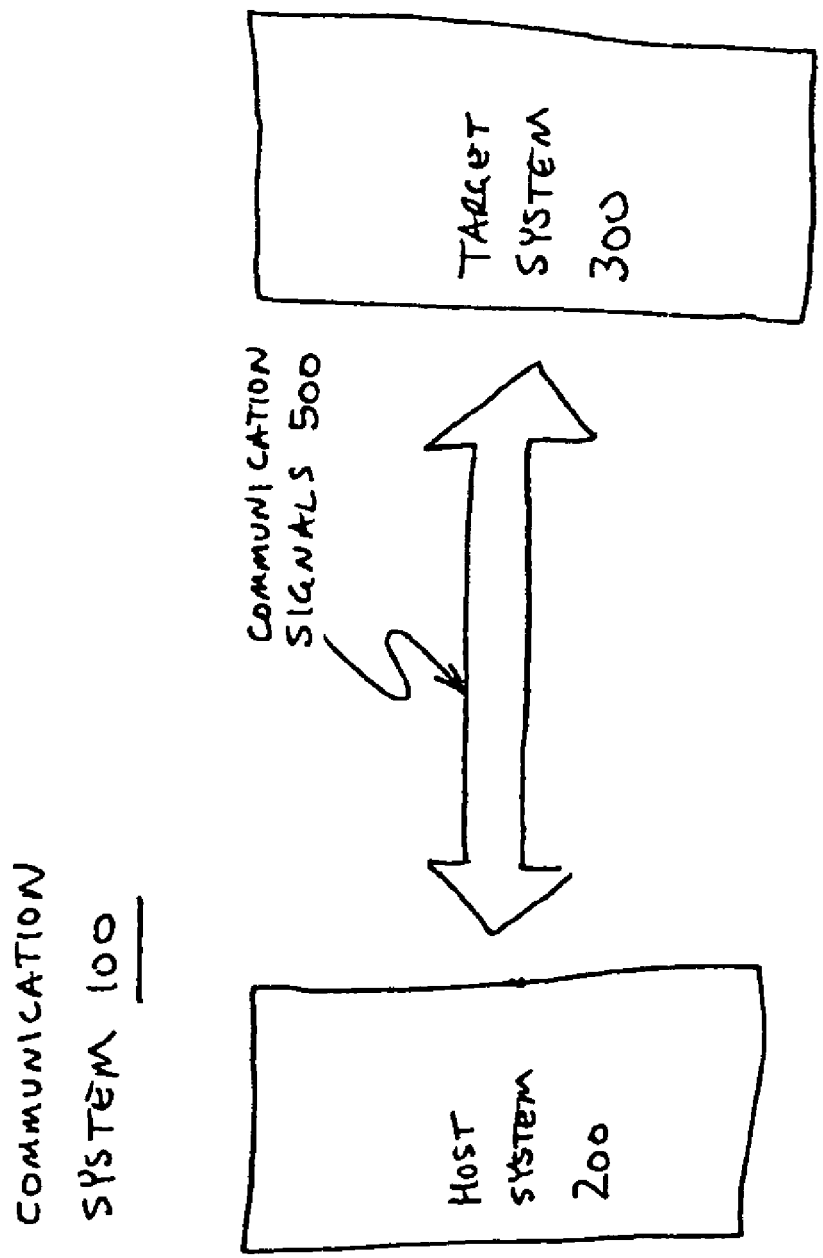
FIG. 1 is an exemplary top-level block diagram illustrating an embodiment of a communication system in which the communication system includes a host system and a target system.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not describe every aspect of the present invention and do not limit the scope of the invention.

DETAILED DESCRIPTION OF THE DRAWINGS

Since conventional hardware emulation systems suffer from several limitations, such as fixed input/output (I/O) technologies and limited I/O timing control, a communication system that includes a target interface system for providing flexible signal routing and timing can prove much more desirable and provide a basis for a wide range of system applications, such as hardware emulation systems. This result can be achieved, according to one embodiment disclosed herein, by employing a communication system 100 as shown in FIG. 1.

The communication system 100 can be provided in any suitable manner, including the manner disclosed in co-pending United States Patent Application, entitled "SYSTEM AND METHOD FOR CONFIGURING COMMUNICATION SYSTEMS," Ser. No. 10/992,165, filed on Nov. 17, 2004, which is assigned to the assignee of the present application and the disclosure of which is hereby incorporated herein by reference in its entirety. As shown in FIG. 1 herein, the exemplary communication system 100 can comprise a host system 200 and at least one target system 300. Typically being coupled via one or more communication cable assemblies 400 (shown in FIG. 2), the host system 200 and each target system 300 are configured to communicate such that communication signals 500 can be exchanged among the host system 200 and the target systems 300.

Figure 2:
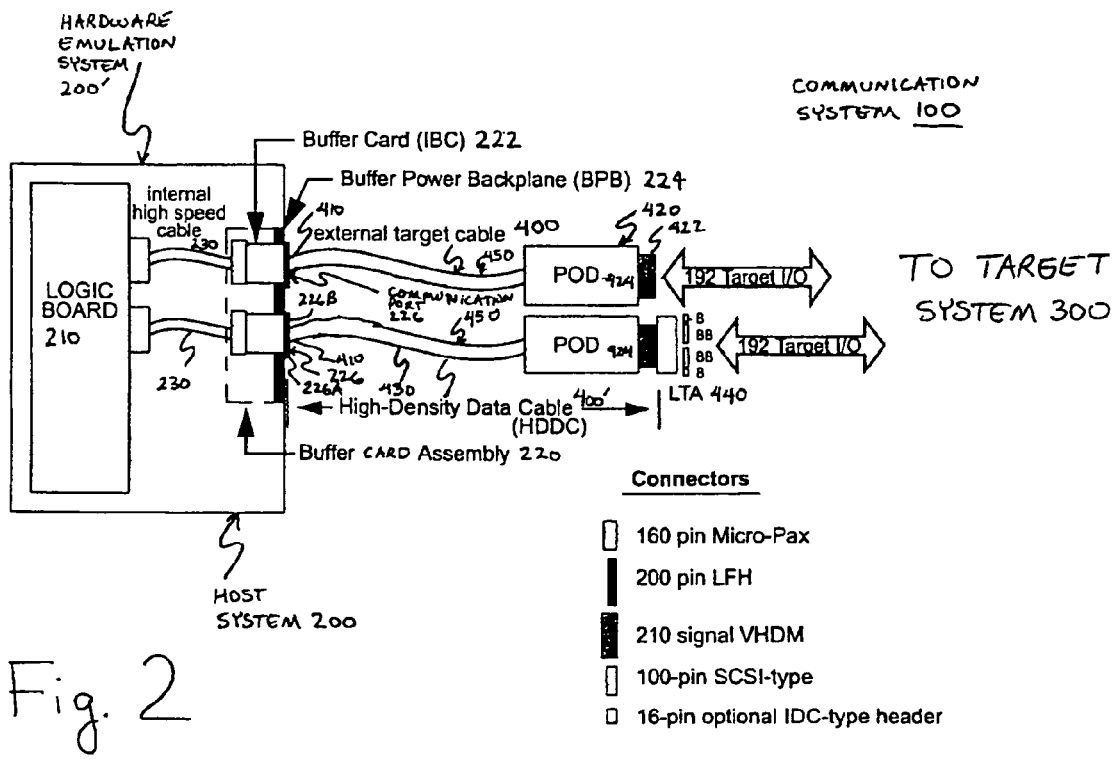
FIG. 2 is an exemplary block diagram illustrating an embodiment of the communication system of FIG. 1 in which the communication system comprises a hardware emulation system for developing one or more components of the target system.

Turning to FIG. 2, the communication system 100 is illustrated as comprising a hardware emulation system 200', such as an accelerator, a simulator, and/or an emulator, for developing the target system 300 and/or one or more components of the target system 300. Prior to manufacture of an integrated circuit, designers generally verify the functionality of their designs (referred to herein as the "design under verification"). The communication system 100 therefore preferably is provided as a hardware emulation system 200' to allow the designers to verify that a design under verification will function in the system in which the integrated circuit will eventually reside (i.e., the target system 300). Exemplary hardware emulation systems include the Palladium acceleration/emulation system and the NC-Sim simulation system each produced by Cadence Design Systems, Inc., of San Jose, Calif.

Further details and features relating to the structure and operation of the communication system 100 and/or the hardware emulation system 200' are disclosed in the following co-pending United States Patent Applications filed on the same date herewith: "SYSTEM AND METHOD FOR RELIABLY SUPPORTING MULTIPLE SIGNALING TECHNOLOGIES," application Ser. No. 11/140,722; "EXTENSIBLE MEMORY ARCHITECTURE AND COMMUNICATION PROTOCOL FOR SUPPORTING MULTIPLE DEVICES IN LOW-BANDWIDTH, ASYNCHRONOUS APPLICATIONS," application Ser. No. 11/141,599; and "SYSTEM AND METHOD FOR RESOLVING ARTIFACTS IN DIFFERENTIAL SIGNALS," application Ser. No. 11/141,141, which are assigned to the assignee of the present application and the respective disclosures of which are hereby incorporated herein by reference in their entireties.

The hardware emulation system 200' shown in FIG. 2 includes a logic board 210 and a buffer card assembly 220. The logic board 210 is a printed circuit board carrying either logic devices and interconnect devices or processor chips. Illustrated as being coupled with the logic board 210 via one or more internal high-speed communication cables 230, the buffer card assembly 220 provides an input/output (I/O) system for the hardware emulation system 200'. The buffer card assembly 220 includes at least one interface buffer card 222 for providing buffering to electrically protect the emulation modules of the logic board 210 from external effects and a buffer power backplane 224. Preferably providing power to each interface buffer card 222, the buffer power backplane 224 likewise provides information regarding the location of each interface buffer card 222 for the purposes of configuration detection and verification.

The target system 300 likewise can include other peripheral systems and subsystems of the hardware emulation system 200', as desired. Because such emulated representations allow a circuit designer flexibly to operate or develop the target system 300 coupled to the emulated representation, even before the prototype circuit design or hardware is actually manufactured, overall design time and cost is reduced significantly. As desired, other peripheral systems (not shown), such as one or more additional hardware or software development platforms, computers, and/or test equipment, also may be coupled with the host system 200 and/or the target system 300. By providing an emulation environment for the target system 300, the host system 200 can for perform functional verification for all of, or at least one component of, the target system 300 in any appropriate manner. The host system 200, for instance, can provide co-simulation and/or simulation acceleration and/or can be configured for in-circuit use. The host system 200 likewise can provide a platform for performing hardware and software co-verification for the target system 300.

For example, the target system 300 can include a logic circuit and can be assembled, along with one or more electronic components, such as integrated components and/or discrete components, on a hardware development platform (not shown) in the manner known in the art. Exemplary logic circuits can include reconfigurable logic circuits, such as one or more field-programmable gate arrays (FPGAs), and/or non-reconfigurable logic circuits, such as one or more application-specific integrated circuits (ASICs). Once assembled, the reconfigurable logic circuit can be customized to implement a user design by loading configuration data into the reconfigurable logic circuit. By programming the internal memory cells, a customized configuration is established within the reconfigurable logic circuit. Thereby, the user design can be implemented by the reconfigurable logic circuit and evaluated by operating the reconfigurable logic circuit on the hardware development platform and in conjunction with the hardware emulation system and any other peripheral systems.

Each interface buffer card 222 includes at least one communication port 226 for coupling the hardware emulation system 200' with one or more target systems 300, communication cable assemblies 400, and/or other external systems or devices. Each communication port 226 includes a connector assembly 226A having a plurality of contacts, pins, or terminals 226B, such as user-definable terminals and/or reserved terminals. Each communication port 226 can have any appropriate number of terminals 226B, which number can be related to the number of communication signals 500 (shown in FIG. 1) to be supported by the communication port 226. The communication signals 500 thereby can be exchanged among the hardware emulation system 200' with one or more target systems 300, communication cable assemblies 400, and/or other external systems or devices, as desired.

The buffer card assembly 220 of the hardware emulation system 200' is illustrated in FIG. 2 as being configured to couple with the target systems 300 via communication cable assemblies 400. Therefore, the buffer card assembly 220 and the communication cable assemblies 400 can form a target interface system 450 for coupling the hardware emulation system 200' and the target systems 300. Although any suitable type of communication cable assemblies 400 can be used to couple the hardware emulation system 200' with the target systems 300, the communication cable assemblies 400 preferably comprise at least one high-density data cable 400' and/or at least one direct attach stimulus cable (not shown).

As shown in FIG. 2, each of the high-density data cables 400' can include an emulator connector assembly 410 and a target connector assembly 420 that are coupled via a communication cable 430. Although shown and described as being provided adjacent to the opposite end regions of the communication cable 430 for purposes of illustration, the emulator connector assembly 410 and the target connector assembly 420 can be associated with any suitable portion, such as an intermediate region, of the communication cable 430 and can be provided in any suitable manner. Being configured to couple with, and/or mate with, communication ports (not shown) of the target systems 300, the target connector assembly 420 is illustrated as comprising a connector assembly 422 and an interface system (or pod) 424. The interface system (or pod) 424 can include analog and/or digital devices and is configured to perform one or more functions associated with the target interface system 450. Preferably, the bulk of the functions associated with the target interface system 450 are performed by the interface system (or pod) 424.

As desired, a legacy target adapter 440 can disposed between the target connector assembly 420 and the target systems 300 as illustrated in FIG. 2. The legacy target adapter 440 can be configured to provide back-compatibility to the legacy form factor for conventional target systems 300, such as conventional target systems 300 supported by Cadence Design Systems, Inc., of San Jose, Calif. In the manner discussed above with regard to the target connector assembly 420, the emulator connector assembly 410 can include a connector assembly (not shown) for coupling with, and/or mating with, the communication ports 226 of the hardware emulation system 200'. Thereby, the hardware emulation system 200' and the target systems 300 can be coupled, and configured to communicate, such that the communication signals 500 are exchanged via the communication cable assemblies 400.

Figure 3A:
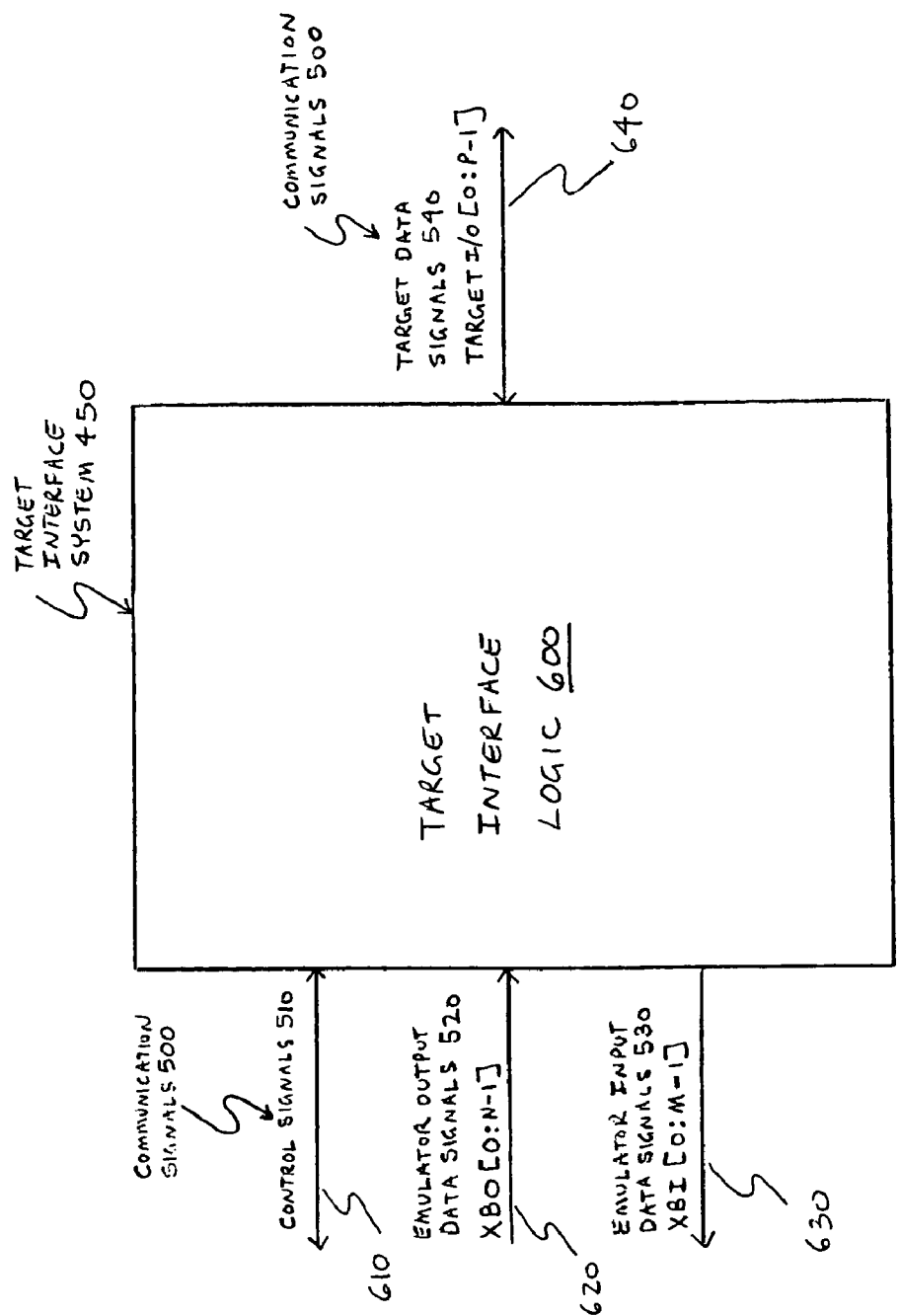
FIG. 3A is an exemplary top-level block diagram illustrating an embodiment of a target interface system for the communication systems of FIGS. 1 and 2 in which the target interface system includes target interface logic.

Turning to FIG. 3A, the target interface system 450 can include target interface logic 600 for facilitating exchanges of communication signals 500 between the hardware emulation system 200' (shown in FIG. 2) and the target system 300 (shown in FIG. 2). Being coupled with, and configured to communicate with, the hardware emulation system 200' and the target system 300, the target interface logic 600 can exchange communication signals 500 with the hardware emulation system 200' and the target system 300. For example, the target interface logic 600 includes one or more control signal connections (or pins) 610 for exchanging control signals 510 with the hardware emulation system 200'.

The target interface logic 600 is illustrated as including at least one emulator data output connections (or pins) 620 for receiving emulator output data (XBO[0:N-1]) signals 520 from the hardware emulation system 200' and at least one emulator data input connections (or pins) 630 for providing emulator input data (XBI[0:M-1]) signals 530 to the hardware emulation system 200'. One or more target I/O connections (or pins) 640 are shown in FIG. 3A whereby the target interface logic 600 and the target system 300 can exchange target data (TARGET IO[0:P-1]) signals 540. Comprising configurable (or reconfigurable) as input connections, output connections, and/or bidirectional connections, the target I/O connections 640 can be configured, as desired, to provide the target data signals 540 to the target system 300 and/or to receive the target data signals 540 from the target system 300. Thereby, the target interface logic 600 can facilitate the exchange of communication signals 500 between the emulation system 200' and the target system 300.

Figure 3B:
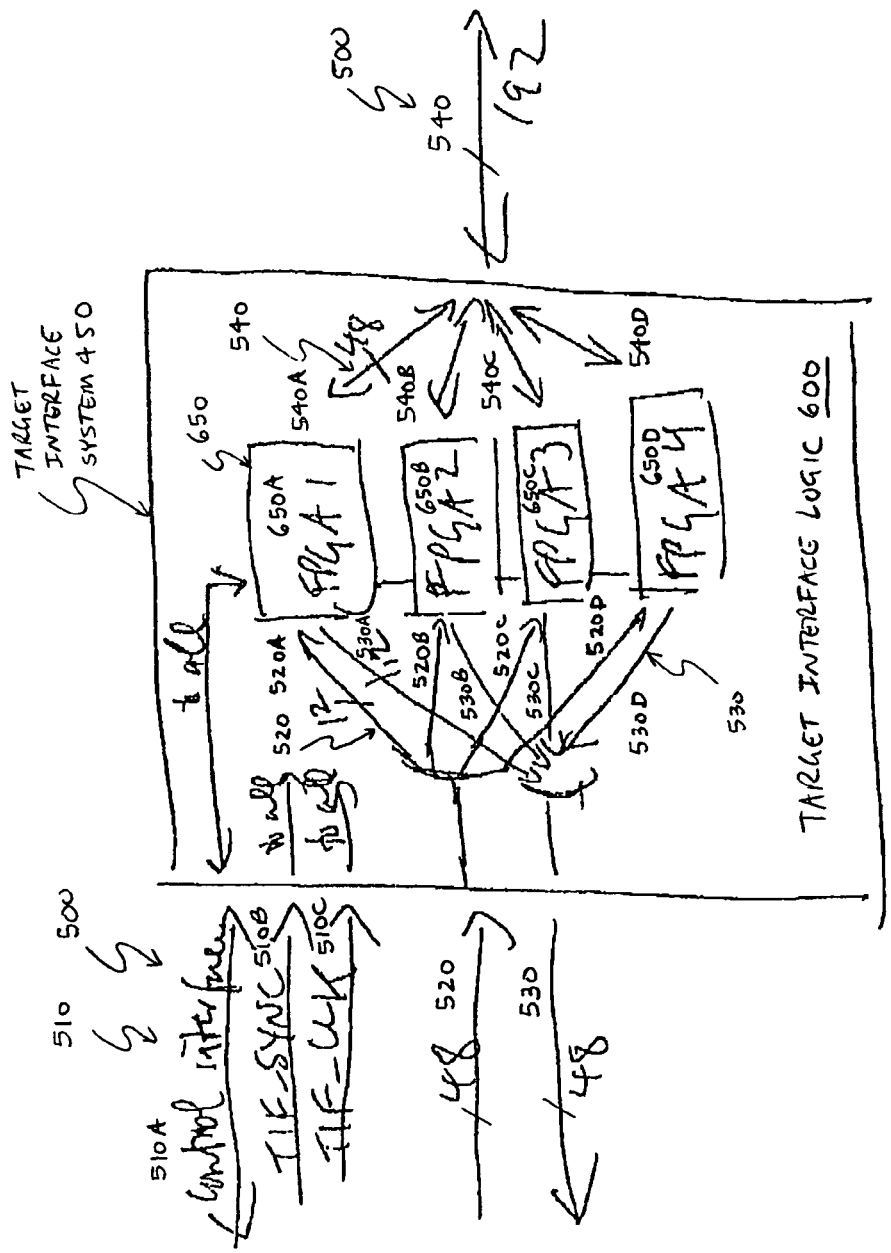
FIG. 3B is an exemplary block diagram illustrating an alternative embodiment of the target interface system of FIG. 3A in which the target interface logic comprises a plurality of field-programmable gate arrays.

The target interface logic 600 can be provided in any conventional manner and, as shown in FIG. 3B, preferably comprises one or more field-programmable gate arrays (FPGAs) 650. A plurality of field-programmable gate arrays 650 can be applied to implement the target interface logic 600 because the required quantity of programmable logic is relatively small and can reduce overall system costs. The field-programmable gate arrays 650 can be programmed via the hardware emulation system 200' (shown in FIG. 2) and are designed such that each field-programmable gate array 650 is programmed with the same file and at the same time. Thereby, the field-programmable gate arrays 650 effectively operate as a single logical (or composite) field-programmable gate array, and the distribution of the target interface logic 600 among the field-programmable gate arrays 650 is transparent to software.

As shown in FIG. 3B, the control signals 510 can include interface control signals 510A, a synchronization (TIF_SYNC) signal 510B for synchronizing the hardware emulation system 200' and the target system 300 (shown in FIG. 2), and a system clock (TIF_CLK) signal 510C. The synchronization (TIF_SYNC) signal 510B initiates a sequence of target interface (or TIF) cycles, each of which comprise a complete clock cycle of the system clock signal 510C. The interface control signals 510A provide configuration data for the target interface logic 600; whereas, the synchronization signal 510B and the system clock signal 510C provide synchronization information for the target interface logic 600. Since the effective operating speed for the target system 300 typically is many times slower than the maximum clock rate of the emulation system 200' itself, a number of internal system clock signal 510C are required to emulate one clock cycle of the target system 300. In the conventional manner, the rising edges of the synchronization signal 510B initiate the emulation cycles, which comprise a plurality of cycles of the system clock signal 510C (or TIF cycles) and which are each approximately equal to one clock cycle of the target system 300.

The target interface logic 600 can receive N emulator output data (XBO[0:N-1]) signals 520 from the hardware emulation system 200' and can provide M emulator input data (XBI[0:M-1]) signals 530 to the hardware emulation system 200'. Similarly, the target interface logic 600 and the target system 300 can exchange P target data (TARGET I/O[0:P-1]) signals 540. The emulator output data signals 520, the emulator input data signals 530, and the target data signals 540 can comprise any suitable number N, M, P of signals, respectively. As desired, the number N, M, P of signals can be uniform and/or different among the emulator output data signals 520, the emulator input data signals 530, and the target data signals 540.

As shown in FIG. 3B, for example, the target interface logic 600 is configured to receive forty-eight (48) emulator output data signals 520 from the hardware emulation system 200' and to provide forty-eight (48) emulator input data signals 530 to the hardware emulation system 200'. Although the emulator output data signals 520 and the emulator input data signals 530 are shown and described as being exchanged via separate connections for purposes of illustration, the target interface logic 600 and the hardware emulation system 200' can exchange the emulator output data signals 520 and the emulator input data signals 530 in any suitable manner, including via one or more bidirectional connections. The target interface logic 600 likewise is illustrated as exchanging one hundred, ninety-two (192) target data signals 540 with the target system 300. In the manner discussed above, the target interface logic 600 and the target system 300 can exchange the target data signals 540 in any conventional manner, including any suitable number of separate connections and/or bidirectional connections.

When the target interface logic 600 comprises four field-programmable gate arrays 650A-D as illustrated in FIG. 3B, the interface control signals 510A, the synchronization signal 5101B, and the system clock signal 510C are provided to each of the field-programmable gate arrays 650A-D. The forty-eight emulator output data signals 520 and the forty-eight emulator input data signals 530, in contrast, are distributed among the four field-programmable gate arrays 650A-D. For example, the forty-eight emulator output data signals 520 and the forty-eight emulator input data signals 530 can be respectively divided into four (4) groups 520A-D of twelve (12) emulator output data signals 520 and four (4) groups 530A-D of twelve (12) emulator input data signals 530.

As shown in FIG. 3B, the hardware emulation system 200' and the field-programmable gate array 650A can exchange the twelve emulator output data signals 520 in the first group 520A and the twelve emulator input data signals 530 in the first group 520A; whereas, the second group 520B of emulator output data signals 520 and the second group 530B of emulator input data signals 530 can be exchanged between the hardware emulation system 200' and the field-programmable gate array 650B. The hardware emulation system 200' and the field-programmable gate arrays 650C, 650D likewise can respectively exchange the emulator output data signals 520 in the third and fourth groups 520C, 520D and the emulator input data signals 530 in the third and fourth groups 530C, 530D as set forth above.

In a similar manner, the one hundred, ninety-two target data signals 540 likewise can be divided into groups 540A-N of target data signals 540 when the target interface logic 600 has more than one field-programmable gate array 650. The target data signals 540 thereby can be distributed among the field-programmable gate arrays 650. If the target interface logic 600 comprises the four field-programmable gate arrays 650A-D, for example, the one hundred, ninety-two target data signals 540 can be divided into four (4) groups 540A-D of target data signals 540. Each of the groups 540A-D can include forty-eight (48) of the target data signals 540 as illustrated in FIG. 3B.

In the manner set forth above, the field-programmable gate array 650A and the target system 300 can exchange the first group 540A of forty-eight target data signals 540, and the second group 540B of forty-eight target data signals 540 can be exchanged between the field-programmable gate array 650B and the target system 300. The field-programmable gate arrays 650C, 650D and the target system 300 likewise can exchange the target data signals 540 in the third and fourth groups 540C, 540D, respectively, as discussed above. Although shown and described as being approximately uniformly distributed among the four field-programmable gate arrays 650A-D for purposes of illustration, the emulator output data signals 520, the emulator input data signals 530, and the target data signals 540 can be divided in any suitable manner among any appropriate number of field-programmable gate arrays 650.

When operating as a single logical (or composite) field-programmable gate array, the field-programmable gate arrays 650A-D preferably are coupled via a serial link (not shown). The serial link forms a ring structure and is clocked by an external clock signal, such as the system clock (TIF_CLK) signal 510C. A frame of data thereby can be sequentially transmitted to each field-programmable gate array 650A-D. The data frame can comprise a fixed-length packet of data, such as a 26-bit word, and circulates among the field-programmable gate arrays 650A-D in the same direction. Upon receiving the data frame, each field-programmable gate array 650A-D can forward the data frame to the next field-programmable gate array 650A-D after a selected number of clock cycles during which the field-programmable gate array 650A-D can process and otherwise manipulate the data.

The operation of the target interface logic 600 of FIGS. 3A-B is illustrated with reference to the exemplary timing diagram 700 shown in FIG. 4. Synchronization of the target interface logic 600 is achieved via the synchronization (TIF_SYNC) signal 510B and the system clock (TIF_CLK) signal 510C. The hardware emulation system 200' (shown in FIG. 2) provides the synchronization (TIF_SYNC) signal 510B and the system clock (TIF_CLK) signal 510C to dedicated input connections of the target interface logic 600. A manner in which the hardware emulation system 200' provides the synchronization (TIF_SYNC) signal 510B and the system clock (TIF_CLK) signal 510C is set forth in the co-pending application, entitled "SYSTEM AND METHOD FOR RELIABLY SUPPORTING MULTIPLE SIGNALING TECHNOLOGIES," application Ser. No. 11/140,722, which is assigned to the assignee of the present application and the disclosure of which is hereby incorporated herein by reference in its entirety.

Figure 4:
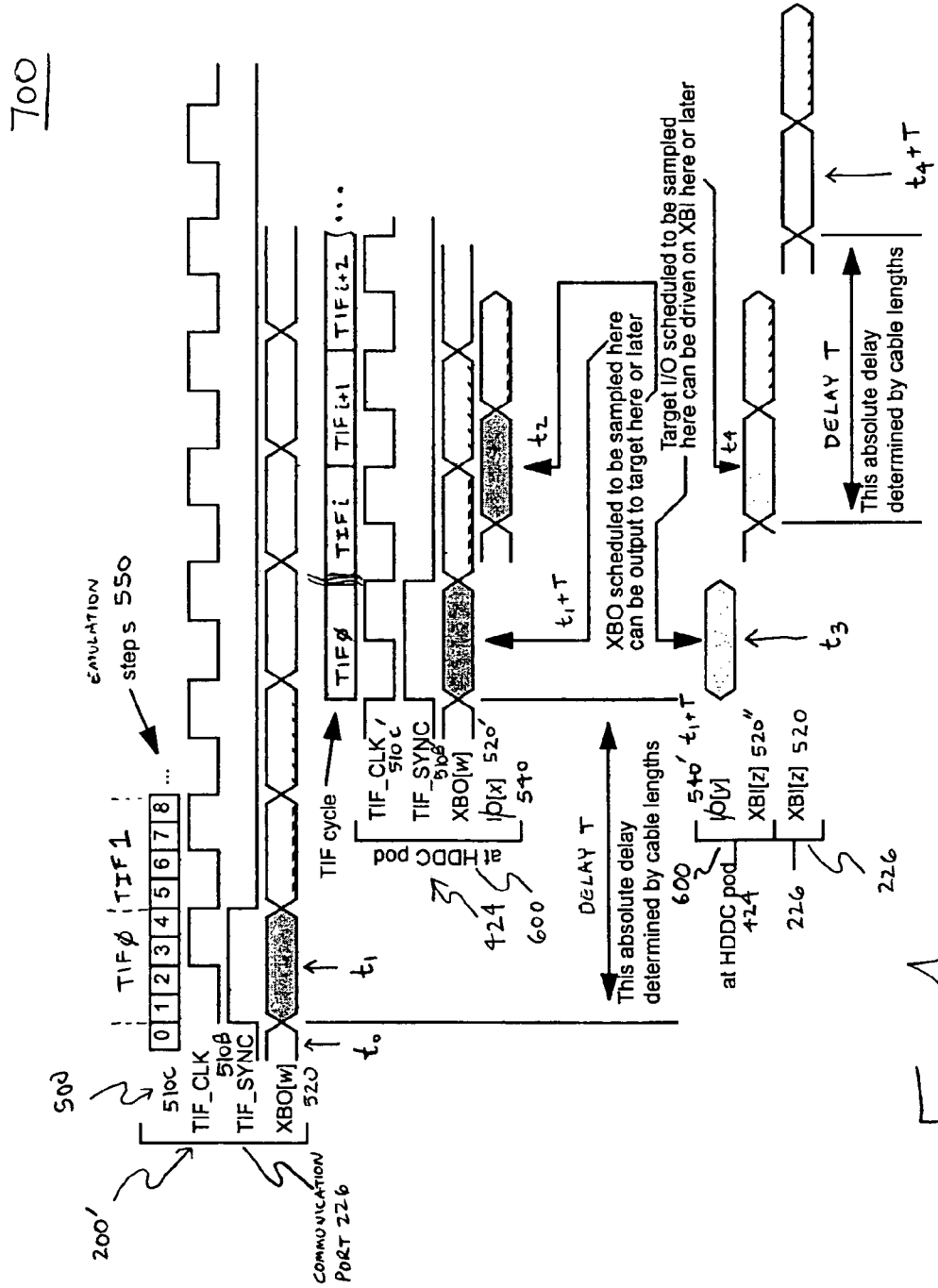
FIG. 4 is an exemplary timing diagram illustrating the operation of the target interface logic of FIGS. 3A-B.

As illustrated in FIG. 4, the target interface logic 600 samples the emulator output data signals 520 and drives the emulator input data signals 530 coincident with the edges of the system clock (TIF_CLK) signal 510C. The system clock (TIF_CLK) signal 510C is shown as being associated with a sequence of emulation steps 550. When performing the emulation, the emulation system 200' sequentially executes each of the emulation steps 550 in the conventional manner. During each emulation step 550, the emulation system 200' can provide the emulator output data signals 520 to, and/or receive the emulator input data signals 530 from, the target interface logic 600 and, therefore, the target system 300 (shown in FIG. 2). The duration of the emulation steps 550 is related to the frequency of the system clock (TIF_CLK) signal 510C and typically range between approximately five nanoseconds (5 nsec.) and twenty nanoseconds (20 nsec.). Although each TIF cycle is shown and described as being associated with four steps 550 for purposes of illustration, the TIF cycles can be associated with any suitable number of emulation steps, as desired.

The emulation system 200' is illustrated as beginning the emulation at time $t_0$. The target interface logic 600 is scheduled in terms of TIF cycles, and the synchronization (TIF_SYNC) signal 510B indicates the initiation of a new TIF cycle, such as first TIF cycle TIF0. The emulator output data signals 520 are provided via the communication port 226 of the hardware emulation system 200' and are sampled on the positive edge of the system clock (TIF_CLK) signal 510C at time $t_1$. The interface control signals 510A (shown in FIG. 3B) therefore preferably update the emulator output data signals 520 on the negative edge of the system clock (TIF_CLK) signal 510C. Since there is no restriction as to how many times or how often I/O operations can be scheduled, the target interface logic 600 can be configured to sample the emulator output data signals 520 on any TIF cycle and/or to drive the emulator input data signals 530 on any TIF cycle, including the same TIF cycle and/or any subsequent TIF cycle, as desired.

In the manner discussed above with reference to FIG. 2, communication signals 500 are transmitted from the hardware emulation system 200' to the target interface logic 600 of the interface system (or pod) 424 via the communication cable 430 (shown in FIG. 2). Due to the length of the communication cable 430, the communication signals 500 experience a propagation delay T while traveling from the hardware emulation system 200' to the target interface logic 600. The synchronization (TIF_SYNC) signal 510B, the system clock (TIF_CLK) signal 510C, and the emulator output data signals 520 therefore are illustrated as being available to the target interface logic 600 as the propagation-delayed synchronization (TIF_SYNC) signal 510B', system clock (TIF_CLK) signal 510C', and emulator output data signals 520', respectively, at time $t_1+T$. Once sampled, the propagation-delayed emulator output data signals 520' can be processed by the target interface logic 600 to produce associated target data signals 540. As illustrated in FIG. 4, the target data signals 540 can be provided to the target system 300 (shown in FIG. 2) at time $t_2$.

The transmission of the communication signals 500 from the target system 300 to the target interface logic 600 and, therefore, the hardware emulation system 200' is provided in a similar manner. The target system 300 is shown as providing the target data signals 540'. The target data signals 540' are sampled on the positive edge of the propagation-delayed system clock (TIF_CLK) signal 510C' at time $t_3$. By sampling the target data signals 540' on the positive edge of the propagation-delayed system clock (TIF_CLK) signal 510C', the target interface logic 600 can be configured to drive other target data signals 540 to the target system 300 during the same TIF cycle via a bidirectional communication connection. The target interface logic 600 subsequently processes the target data signals 540' to produce associated emulator output data signals 520", which can be provided to the emulator output data signals 520" on any TIF cycle, including the same TIF cycle and/or any subsequent TIF cycle, as desired. At time $t_4$, the target interface logic 600 can provide the emulator output data signals 520" as illustrated in FIG. 4. The emulator output data signals 520" reach the hardware emulation system 200' as the emulator output data signals 520 at time $t_4+T$ due to the propagation delay T induced by the communication cable 430 in the manner set forth in more detail above.

Since the effective operating speed for the target system 300 typically is many times slower than the maximum clock rate of the emulation system 200', the emulator output data signals 520 can change several times during a selected emulation cycle. The target data signals 540, in contrast, typically are static during each emulation cycle. Therefore, the number N of the emulator output data signals 520 and the number M of the emulator input data signals 530 each can be smaller than the number P of the target data signals 540. The target interface logic 600 thereby can receive the emulator output data signals 520 from the emulation system 200' and/or provide the emulator input data signals 530 to the emulation system 200' over several TIF cycles during the emulation cycle while maintaining the target data signals 540.

Figure 5:
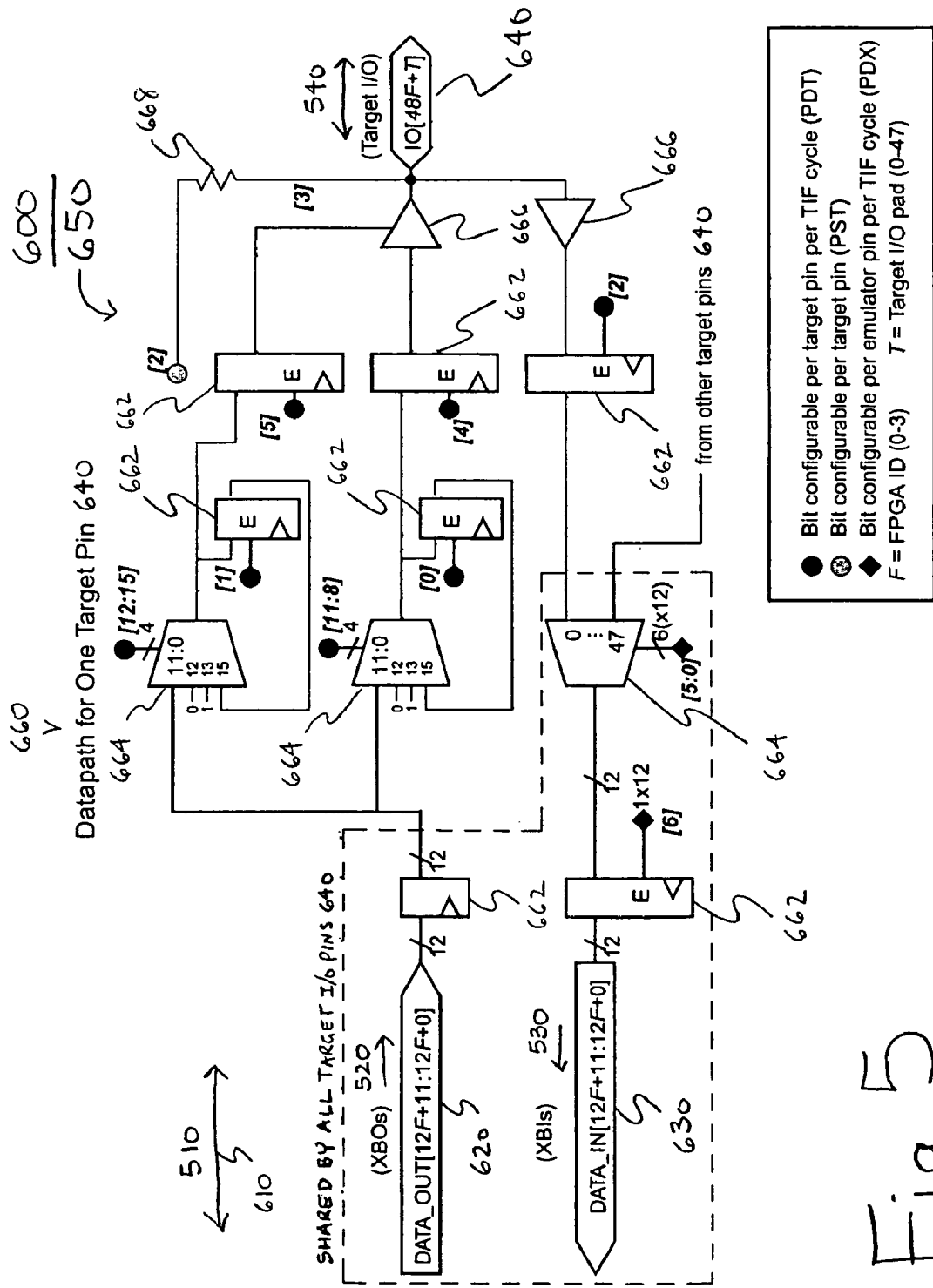
FIG. 5 is a block diagram illustrating an exemplary datapath for a selected target I/O connection (or pin) of the target interface logic of FIGS. 3A-B.

Within the target interface logic 600, the emulator data output connections (or pins) 620 and the emulator data input connections (or pins) 630 are coupled with the target I/O connections (or pins) 640. To enhance the flexibility of the target interface logic 600, each emulator data output pin 620 and each the emulator data input pin 630 preferably are configured to communicate with each of the target I/O pins 640 of the target interface logic 600. FIG. 5 illustrates an exemplary datapath 660 for a selected target I/O pin 640 of the target interface logic 600. When the target interface logic 600 is implemented via the plurality of field-programmable gate arrays 650 as discussed in more detail above, the datapath 660 shown in FIG. 5 can be replicated in each field-programmable gate array 650. Each of the target I/O connections (or pins) 640 for a selected field-programmable gate array 650 thereby can share the emulator data output connections (or pins) 620 and the emulator data input connections (or pins) 630 for that field-programmable gate array 650. Although shown and described as comprising an illustrative arrangement of latches (or registers or flipflops) 662, multiplexers 664, and drivers (or buffers) 666 for purposes of illustration, the datapath 660 can be provided via any suitable configuration of conventional components, as desired.

During each TIF cycle, the target interface logic 600 can prestore the emulator output data signals 520 for a succeeding TIF cycle for each emulator data output pin 620. The target interface logic 600, in other words, can provide the target data signals 540 to the target I/O pins 640 immediately based on the emulator output data signals 520 for the current TIF cycle and/or can provide the target data signals 540 based upon the stored emulator output data signals 520 during any subsequent TIF cycle. Similarly, to provide the input data signals 530 to the hardware emulation system 200', the target interface logic 600 can sample the incoming target data signals 540 during any TIF cycle and can provide the input data signals 530 based upon the incoming target data signals 540 during any TIF cycle, including the same TIF cycle and/or any subsequent TIF cycle. The emulator output data signals 520, the input data signals 530, and the target data signals 540 typically are stored via one or more of the latches 662 forming the datapath 660.

Figure 6:
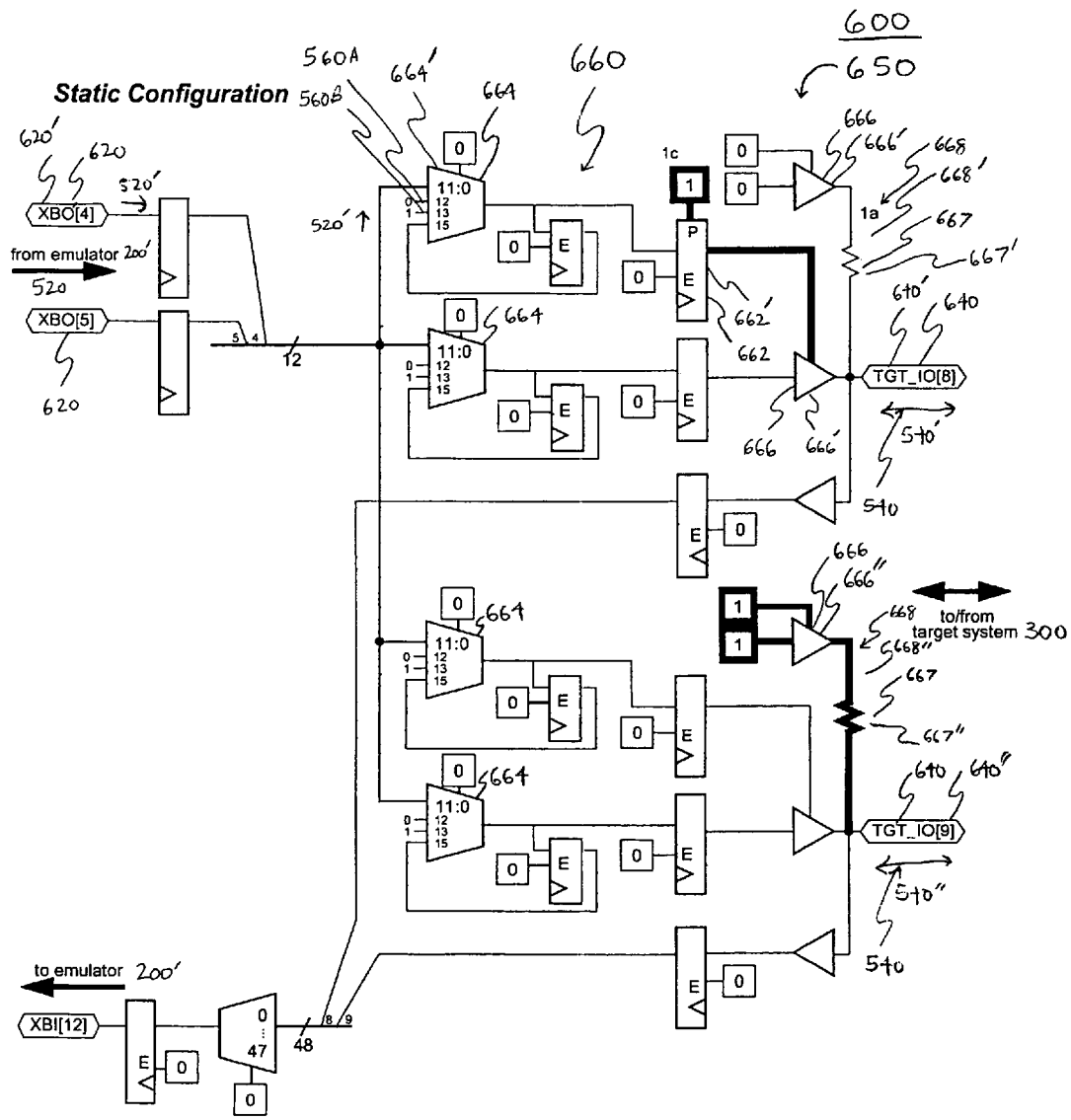
FIG. 6 is a block diagram illustrating the exemplary datapath of FIG. 5 in which the datapath is provided in a static configuration.

The target interface logic 600 likewise can drive one or more of the target I/O pins 640 at a preselected logic level. Turning to FIG. 6, the datapath 660 is shown as including a multiplexer 664' that is coupled with a selected emulator data output pin 620'. The emulator output data signal 520' associated with the selected emulator data output pin 620' thereby can be provided to a first input connection of the multiplexer 664'. As illustrated in FIG. 6, the multiplexer 664' also has second and third connections that are respectively driven to a low logic level 560A and a high logic level 560B. A selected target I/O pins 640' is coupled with, and configured to communicate with, the selected emulator data output pin 620' via the multiplexer 664'. Therefore, the multiplexer 664' is configured to selectably provide the emulator output data signal 520', the low logic level 560A, and/or the high logic level 560B to the selected target I/O pins 640', as desired.

Each of the target I/O pins 640 preferably include biasing circuitry 668, such as pull-up circuitry and/or pull-down circuitry, for biasing the associated target data signals 540. The biasing circuitry 668 can be provided in any conventional manner and, as shown in FIG. 6, can include a driver 666 and a resistive element 667. The biasing circuitry 668 in an inactive mode is illustrated by biasing circuitry 668' in which the driver 666' does not drive the resistive element 667'. The target data signal 540' associated with the selected target I/O pin 640' therefore is not biased. When activated, the exemplary biasing circuitry 668" is configured to bias the target data signal 540" associated with the selected target I/O pin 640" toward a high logic level. As illustrated in FIG. 6, the biasing circuitry 668" is in the activated mode such that the driver 666" drives the resistive element 667". The datapath 660 likewise is shown as including a latch 662' that is coupled with the selected target I/O pin 640'. The latch 662' includes an asynchronous clear function that can force the driver 666' to be in an output enable always mode.

The operation of the exemplary datapath 660 of the target interface logic 600 is shown in FIGS. 7A-E. The datapath 660 is examined over a series of target interface (or TIF) cycles to illustrate one manner by which the target interface logic 600 can process communication signals 500. FIGS. 7A-E illustrate the datapath 660 as the target interface logic 600 receives and processes exemplary first and second emulator output data signals 520A, 520B and provides first and second outgoing target data signals 540A, 540B to the target system 300. The datapath 660 likewise is shown as the target interface logic 600 receives and processes first and second incoming target data signals 540A, 540B, subsequently providing first and second emulator input data signals 530A, 530B to the hardware emulation system 200'.

Figure 7A:
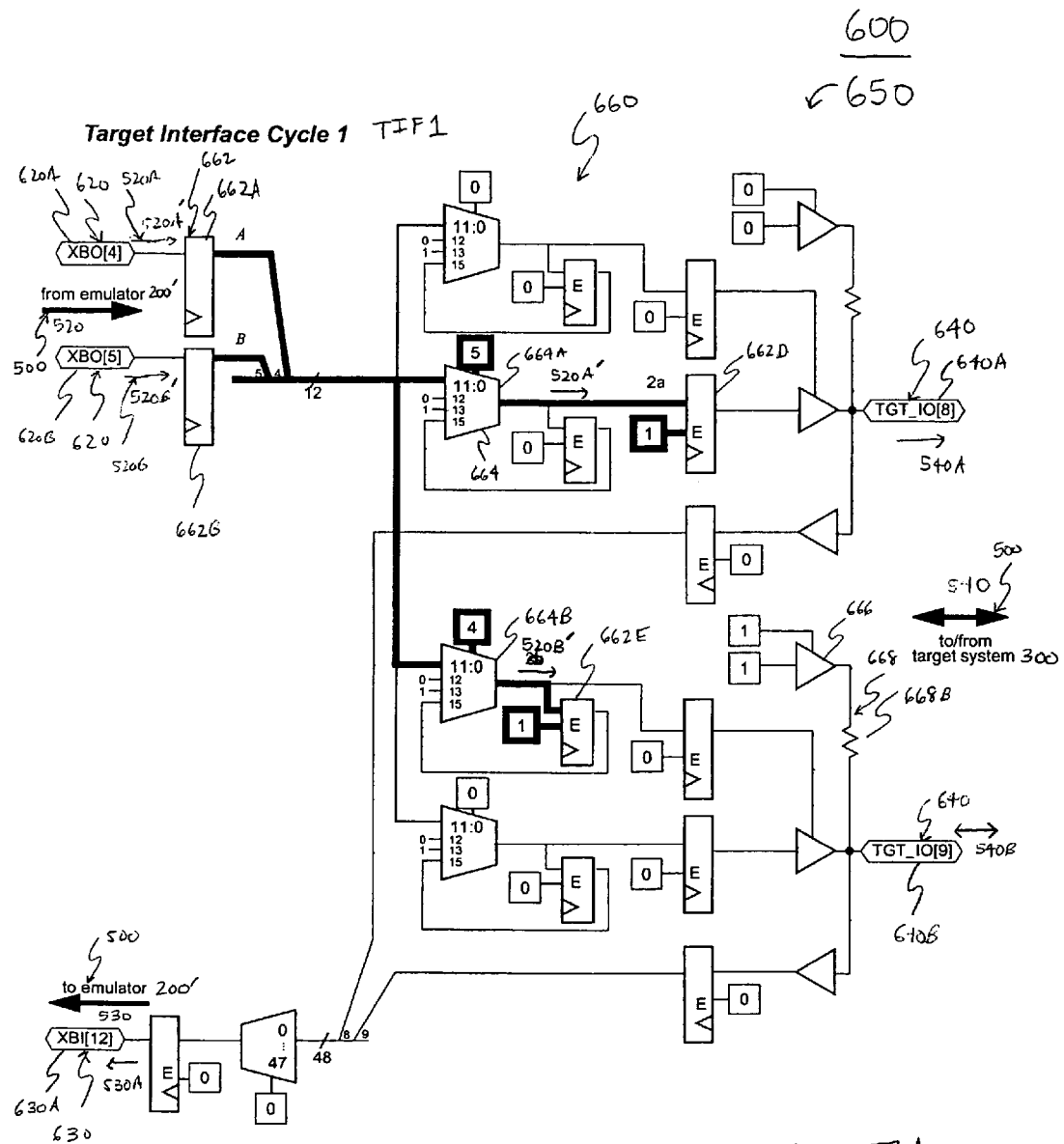
FIGS. 7A-E are a series of block diagrams illustrating the exemplary datapath of FIG. 5 in which the operation of the datapath is shown over a series of target interface cycles.

Turning to FIG. 7A, the datapath 660 is shown during a first target interface cycle TIF1. During the first target interface cycle TIF1, selected emulator output data signals 520A', 520B' are respectively received by the target interface logic 600 via the emulator data output pins 620A, 620B. The datapath 660 is configured to route the emulator output data signal 520A' from the emulator data output pin 620A to a multiplexer 664A via a latch 662A. Upon selecting the emulator output data signal 520A', the multiplexer 664A provides the emulator output data signal 520A' to output latch 662D. The emulator output data signal 520A' thereby is captured by the output latch 662D. The output latch 662D is illustrated as being associated with selected target I/O pin 640A. For purposes of this example, the target I/O pin 640A is configured as an output connection for providing outgoing target data signals 540A during second and fourth target interface cycles TIF2, TIF4.

The datapath 660 also routes the emulator output data signal 520B' from the emulator data output pin 620B to a multiplexer 664B via a latch 662B during the first target interface cycle TIF1. The multiplexer 664B is configured to select the emulator output data signal 520B' and to provide the emulator output data signal 520B' to internal latch 662E. The latch 662E can capture and store the emulator output data signal 520B' for later propagation to selected target I/O pin 640B during a subsequent TIF cycle. For purposes of this example, the target I/O pin 640B is configured as a bidirectional connection for providing outgoing target data signals 540B during a third target interface cycle TIF3 and for sampling incoming target data signals 540B during the fourth target interface cycle TIF4. The target I/O pin 640B likewise is shown as being biased to a high logic level via active biasing circuitry 668B.

Figure 7B:
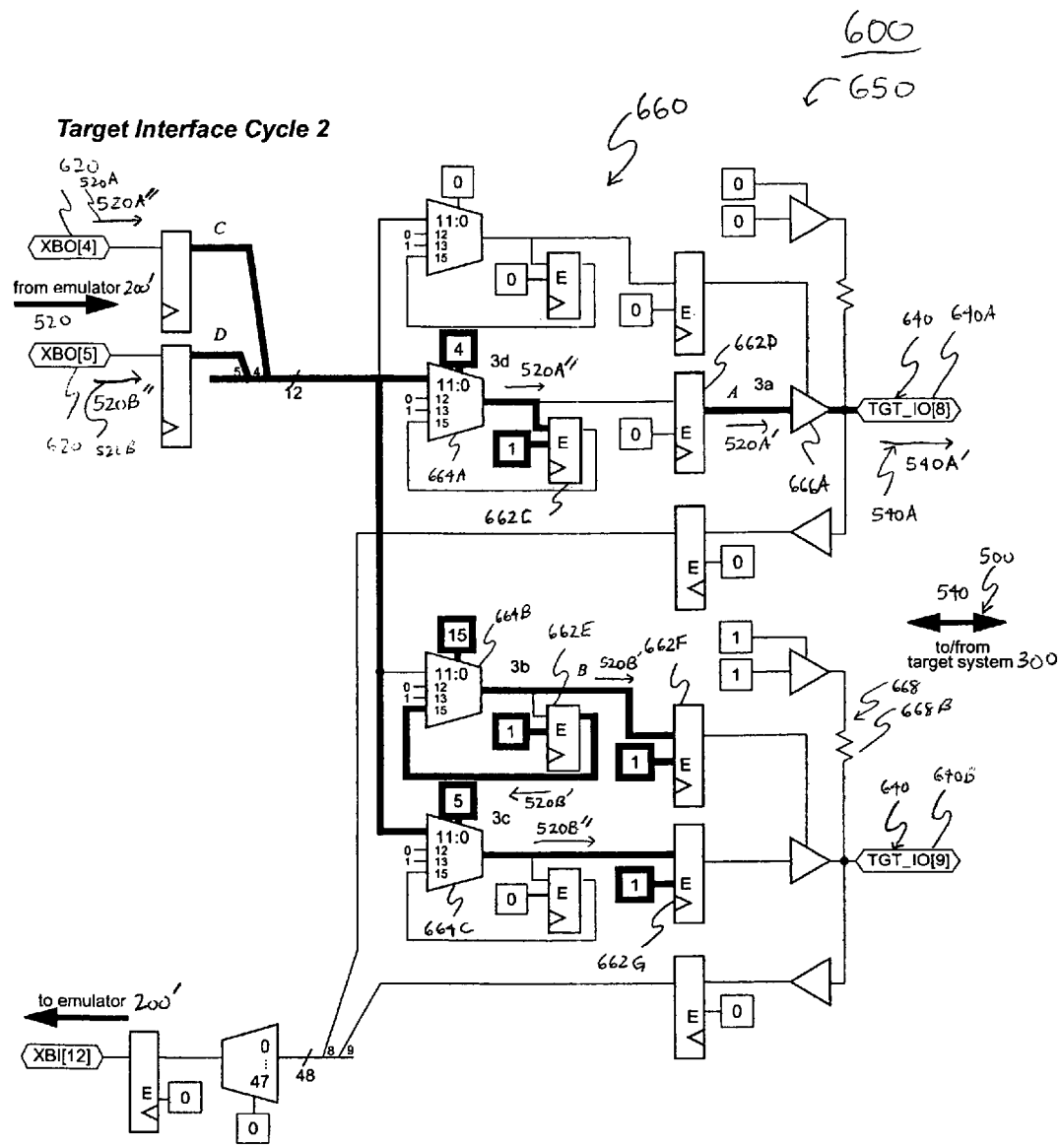

The operation of the datapath 660 is illustrated during the second target interface cycle TIF2 in FIG. 7B. The output latch 662D provides the emulator output data signal 520A' to the target I/O pin 640A via driver 666A as outgoing target data signal 540A'. The outgoing target data signal 540A' thereby can be provided to the target system 300 in the manner set forth in more detail above. During the second target interface cycle TIF2, the emulator output data signal 520B' stored by the latch 662E can be retrieved and routed from the latch 662E to tristate-enable output latch 662F. As shown in FIG. 7B, the emulator output data signal 520B' is routed from the latch 662E to the tristate-enable output latch 662F via the multiplexer 664B.

Emulator output data signals 520A", 520B" likewise are shown as being received by the target interface logic 600 via the emulator data output pins 620A, 620B, respectively, during the second target interface cycle TIF2. As discussed above with reference to the emulator output data signal 520A' (shown in FIG. 7A), the datapath 660 is configured to route the emulator output data signal 520A" from the emulator data output pin 620A to the multiplexer 664A. The multiplexer 664A can select the emulator output data signal 520A" and provide the emulator output data signal 520A" to internal latch 662C. The latch 662C can capture and store the emulator output data signal 520A" for later propagation to selected target I/O pin 640A during a subsequent TIF cycle. The datapath 660 also routes the emulator output data signal 520B" from the emulator data output pin 620B to a multiplexer 664C in the manner set forth above with reference to the emulator output data signal 520B' (shown in FIG. 7A). Upon being selected by the multiplexer 664C, the emulator output data signal 520B" is provided to, and captured by, output latch 662G, which is associated with selected target I/O pin 640B.

Figure 7C:
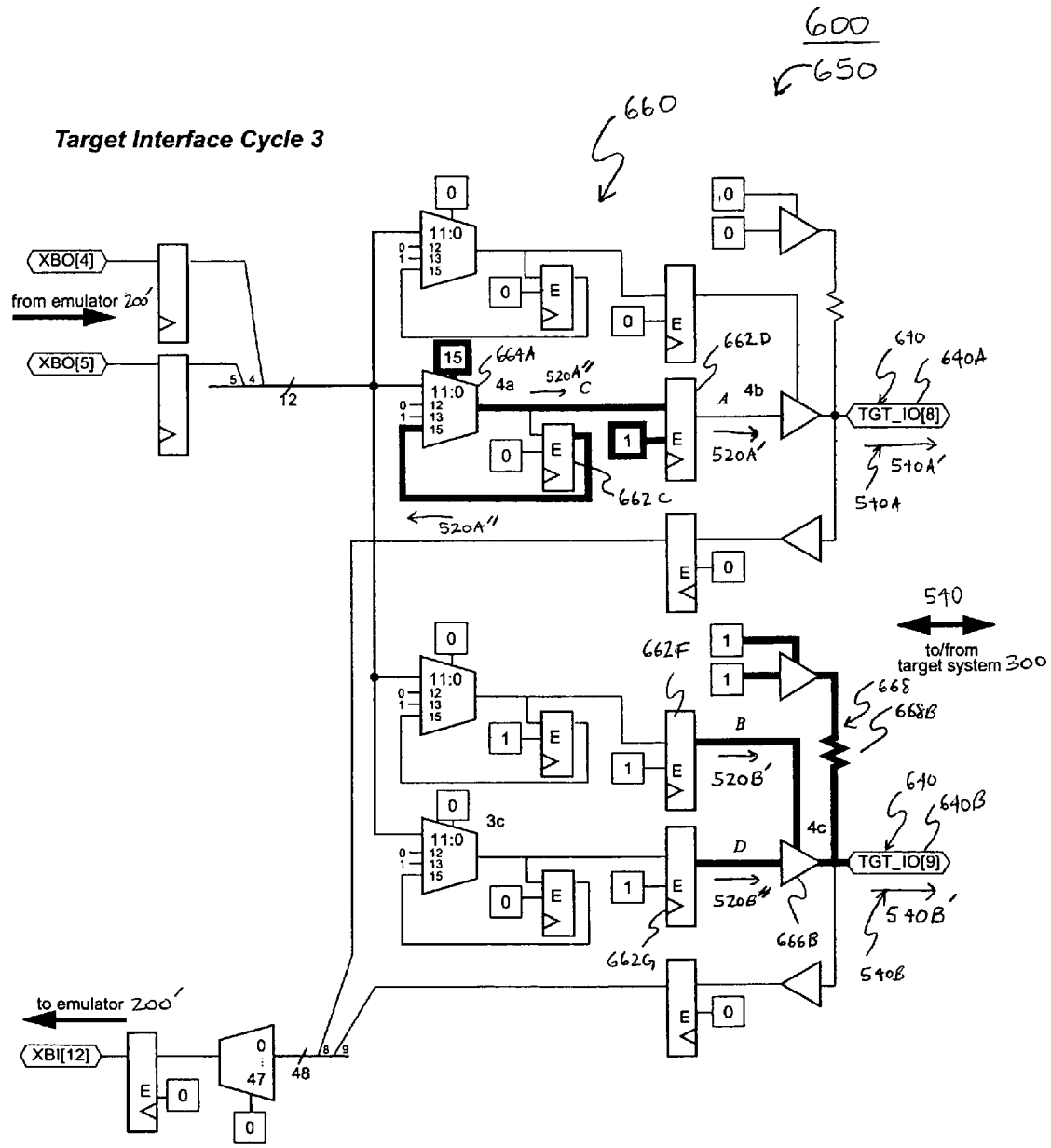

FIG. 7C shows the datapath 660 during the third target interface cycle TIF3. As shown in FIG. 7C, the output latch 662D continues to provide the emulator output data signal 520A' to the target I/O pin 640A as the outgoing target data signal 540A'; whereas, the emulator output data signal 520A" stored by the latch 662C can be retrieved and routed to the output latch 662D via the multiplexer 664A. The signal state of the target I/O pin 640B is determined as a function of the emulator output data signals 520B', 520B". If the emulator output data signal 520B' comprises a high logic level, driver 666B is enabled such that the output latch 662G can provide the emulator output data signal 520B" to the target I/O pin 640B as the outgoing target data signal 540B'. Otherwise, if driven by the target system 300, the target I/O pin 640B can receive an incoming target data signal 540B" (shown in FIG. 7D) from the target system 300. The biasing circuitry 668B pulls the bidirectional target I/O pin 640B to a high logic state when the target I/O pin 640B is not driven via the datapath 660 or the target system 300.

Figure 7D:
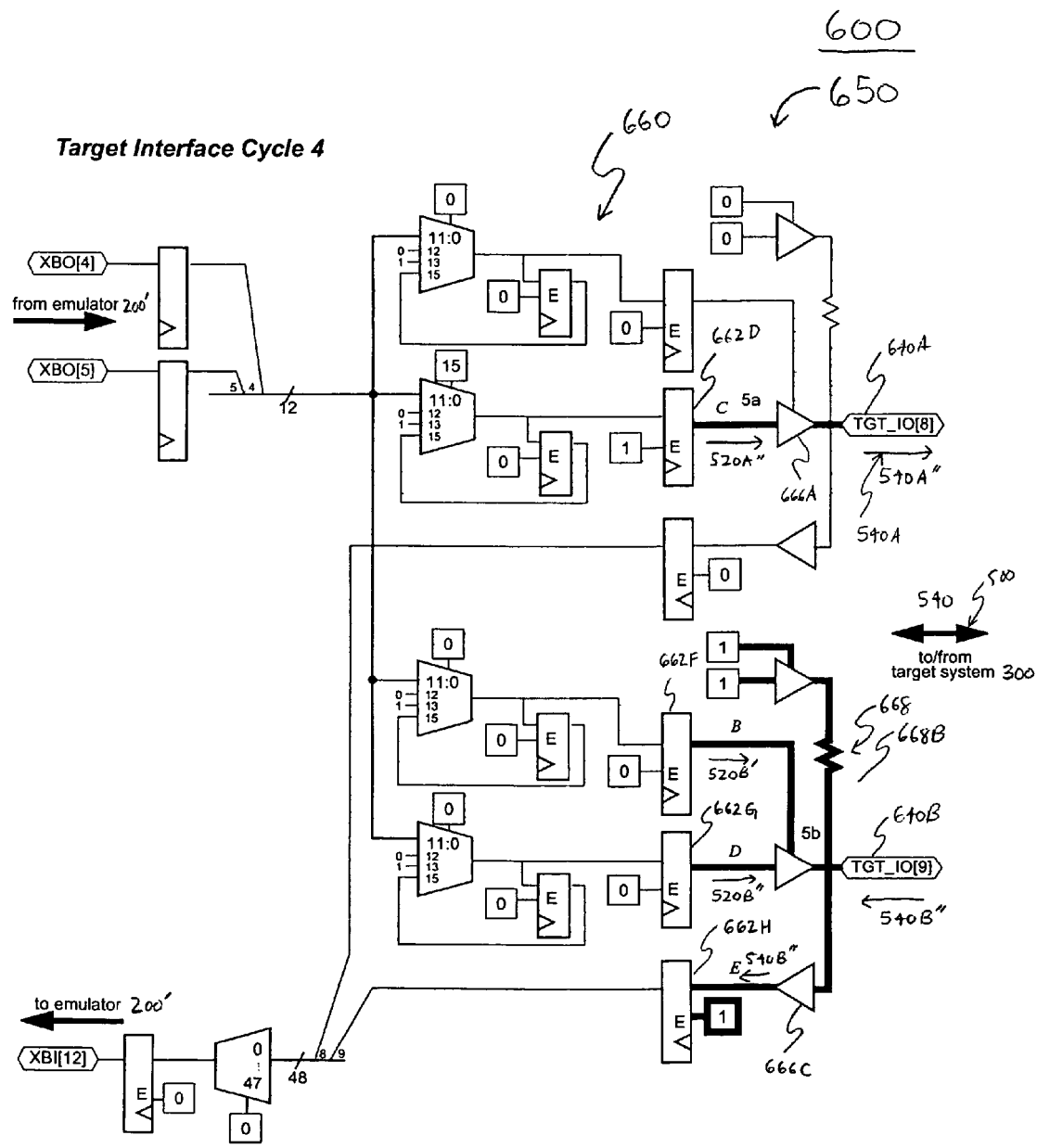

Turning to FIG. 7D, the datapath 660 is shown during the fourth target interface cycle TIF4. During the fourth target interface cycle TIF4, the emulator output data signal 520A" is illustrated as being captured by the output latch 662D. In the manner set forth in more detail above, the output latch 662D provides the emulator output data signal 520A" to the target I/O pin 640A as outgoing target data signal 540A", which can be provided, in turn, to the target system 300. The target interface logic 600 likewise receives a selected incoming target data signal 540B" from the target system 300 during the fourth target interface cycle TIF4. The incoming target data signal 540B" is received by the target interface logic 600 via the selected bidirectional target I/O pin 640B, which is driven by the target system 300. The datapath 660 is configured to route the incoming target data signal 540B" from the target I/O pin 640B to a latch 662H via a driver 666C.

Figure 7E:
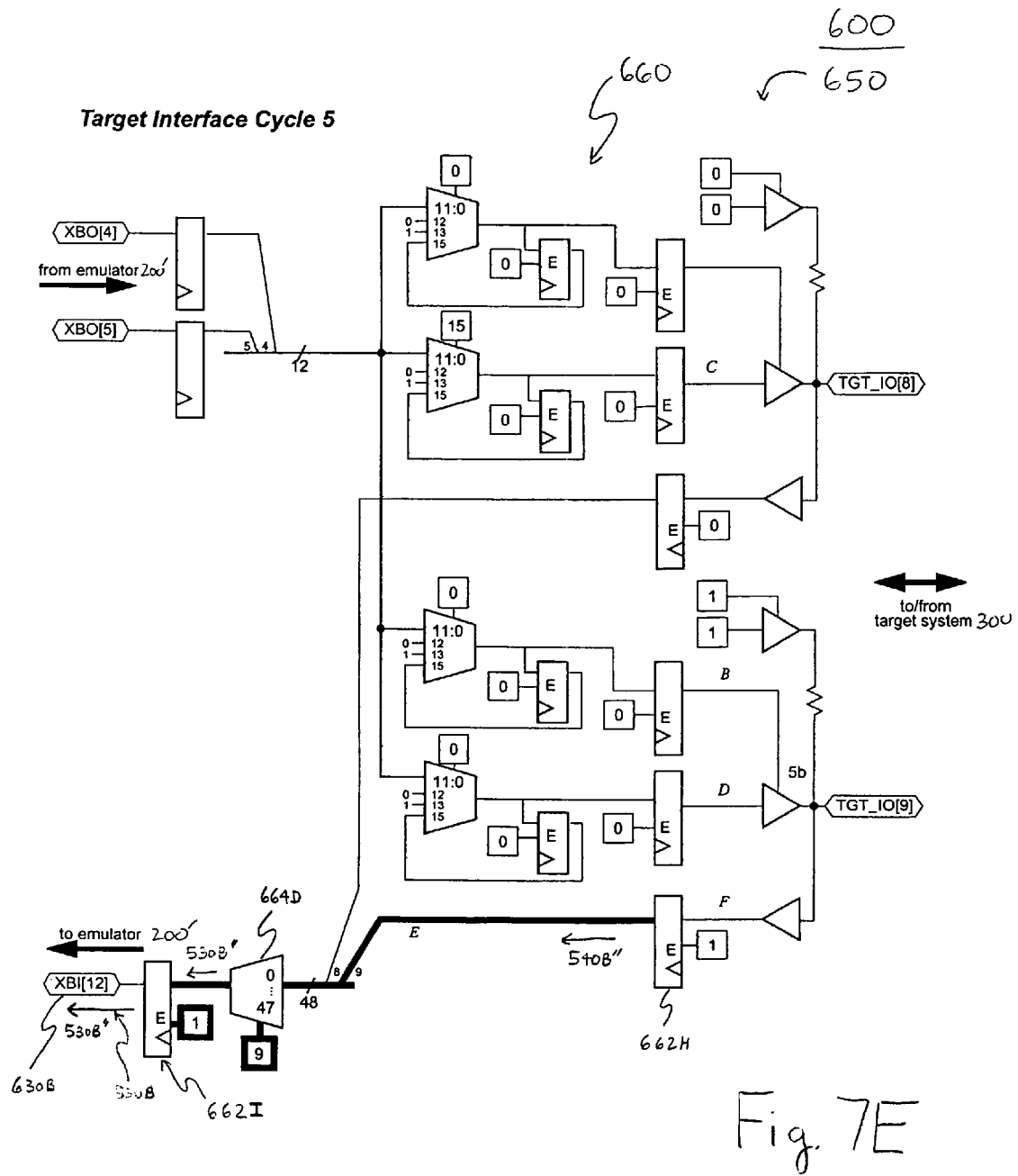

As illustrated in FIG. 7E, the incoming target data signal 540B" is captured by the latch 662H during the fifth target interface cycle TIF5. The datapath 660 is configured to route the incoming target data signal 540B" from the latch 662H to a multiplexer 664D, which is illustrated as being associated with selected emulator data input pin 630B. Upon selecting the incoming target data signal 540B", the multiplexer 664A provides the incoming target data signal 540B" to the emulator data input pin 630B via a latch 662I. The incoming target data signal 540B" is provided to the emulator data input pin 630B as emulator input data signal 530B". Although shown and described as comprising a datapath 660 for routing exemplary signals for purposes of illustration, the target interface logic 600 can comprise any configuration of conventional components for routing emulator output data signals 520, emulator input data signals 530, and/or target data signals 540.

The processing of differential target data signals 540 often give rise to complications in conventional emulations systems; however, the target interface logic 600 provides the flexibility to process both single-ended and differential target data signals 540. For conventional target systems 300, the hardware emulation system 200' typically does not know in advance whether the netlist for the target system 300 will provide the differential target data signals 540 via one or two target I/O pins 640. The number of target I/O pins 640 for providing the differential target data signals 540 can depend, for example, on the netlist type, such as whether the netlist comprises a register transfer level (RTL) netlist or a structural netlist, and/or the I/O models used for the target I/O pins 640. The target interface logic 600 advantageously supports a wide range of netlist types and I/O models without requiring changes to the user interface, the pin assignments, the setup information, the precompiler, and/or the scheduler.

The manner by which the target interface logic 600 processes differential target data signals 540 can be illustrated by an exemplary netlist that includes a selected logical net that is to appear as a differential target data signal 540 on a selected pair of adjacent target I/O pins 640. If the netlist identifies only one pin for the selected net, the selected net is assigned to the identified pin for the selected net. Since the associated communication cable 430 (shown in FIG. 2) can be downloaded as a Low-Voltage Differential Signaling (LVDS) cable, the selected pair of the target I/O pins 640 is automatically formed with the appropriate adjacent pin for the selected net, and the target data signals 540 associated with the selected net are provided on the selected pair of adjacent target I/O pins 640. The formation of the selected pair of adjacent target I/O pins 640 can be performed in any conventional manner, including via software and/or hardware, and can include the use of one or more pre-defined pairs of adjacent target I/O pins 640. The target I/O pins 640 can be paired in any suitable manner, such as by pairing each odd target I/O pin 640 with an adjacent even target I/O pin 640. Being implicitly defined via the assignment of the selected net to the identified pin, the second pin in the selected pair need not be identified in any file or via the user interface.

The exemplary netlist alternatively can identify a selected pair of adjacent target I/O pins 640 for providing the pair of differential target data signals 540 associated with the selected logical net. The first differential target data signal 540 associated with the selected logical net is provided via the first pin in the selected pair of adjacent target I/O pins 640; whereas, the second differential target data signal 540 is provided via the second pin in the selected pair. Although the first and second target data signals 540 are expected to be negations of each other, the first and second target data signals 540 may not necessarily negate if, for example, the first and second target data signals 540 are not updated during the same I/O cycle. To resolve this potential inconsistency, each of the selected pair of adjacent target I/O pins 640 are driven to maintain the values of the selected target data signals 540 until updated with a new value. The selected pair of adjacent target I/O pins 640 therefore transition to the new value when the new values of the selected target data signals 540 agree.

The target interface logic 600 can be configured for processing the emulator output data signals 520, emulator input data signals 530, and/or target data signals 540 in any conventional manner. If the target interface logic 600 comprises one or more field-programmable gate arrays (FPGAs) 650 in the manner discussed above with reference to FIG. 3B, the programming of the field-programmable gate arrays 650 and the configuration of the I/O timing functions can be performed via a Joint Test Action Group (JTAG) cable (not shown) from the hardware emulation system 200'. The configuration of the field-programmable gate arrays 650 preferably is internally memory mapped, and each primitive JTAG instruction includes an address and data for write operations and/or an address for read operations. Since the amount of data to configure the field-programmable gate arrays 650 typically will be less than that required to program the field-programmable gate arrays 650, the number of different types of operations to be performed by the field-programmable gate arrays 650 advantageously can be reduced. Preferably, the number of different operation types can be reduced to selecting the field-programmable gate array 650 to be addressed and performing a memory-style operation.

Figure 8:
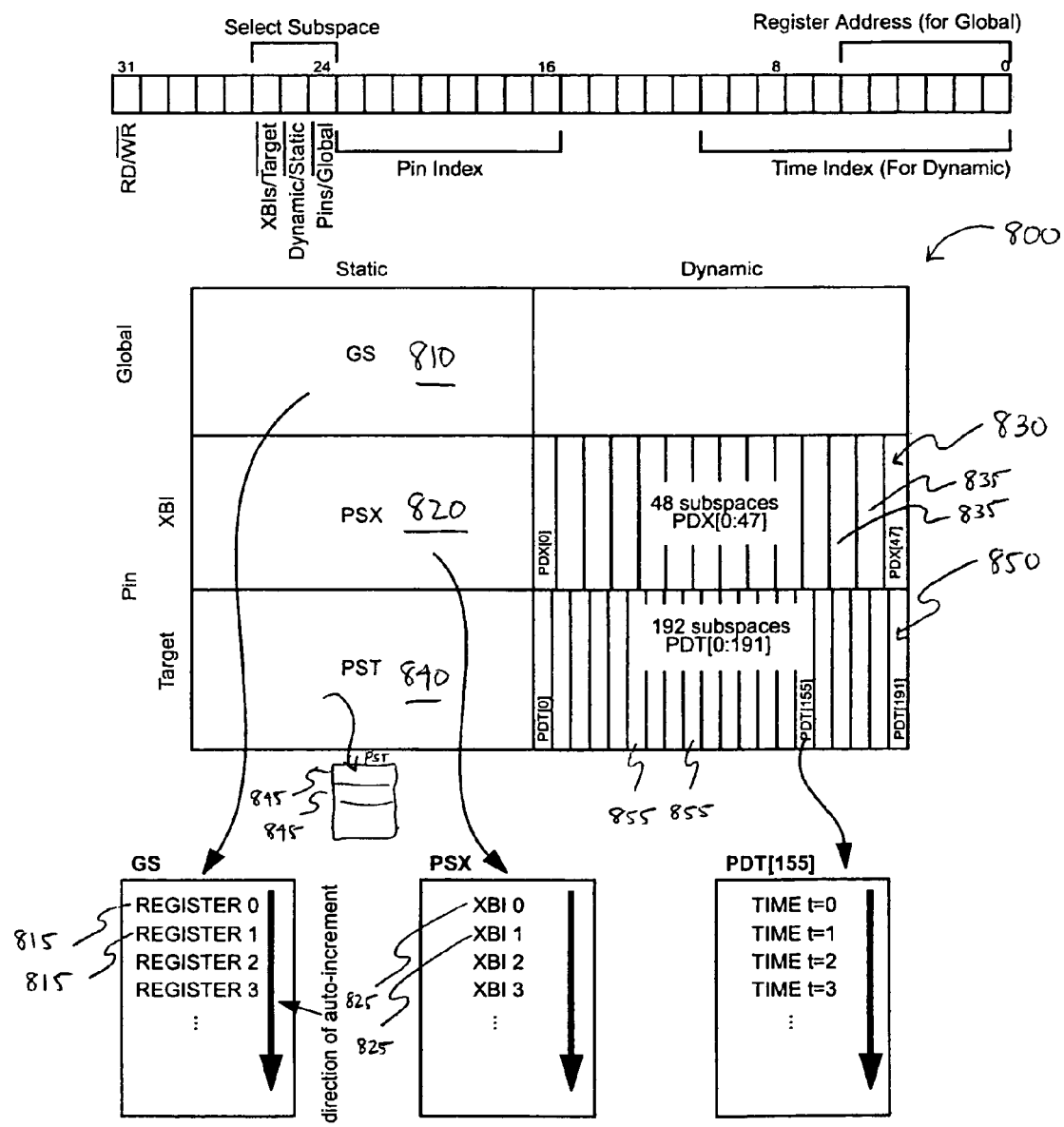
FIG. 8 is a block diagram illustrating an exemplary configuration memory space of the target interface logic of FIGS. 3A-B.

The target interface logic 600 includes a configuration memory space 800 for storing configuration information as illustrated in FIG. 8. Generally being organized on a per-connections (or per-pins) basis, the target interface logic 600 (shown in FIGS. 3A-B) includes a plurality of memory subspaces 810, 820, 830, 840, and 850 for organizing the configuration information. Exemplary general divisions for the configuration memory space 800 include static memory subspaces, such as memory subspaces 810, 820, and 840, and dynamic memory subspaces, such as memory subspaces 830, 850. The configuration memory space 800 likewise can be generally divided among global memory subspace 810 and local memory subspaces, including memory subspaces 820, 830 for configuring the emulator data input connections (or pins) 630 (shown in FIGS. 3A-B) and memory subspaces 840, 850 for configuring the target I/O connections (or pins) 640 (shown in FIGS. 3A-B). It will be appreciated that the memory subspaces 810, 820, 830, 840, and 850 as illustrated and described are merely exemplary and not exhaustive.

The global memory (GS) subspace 810 is a static memory subspace and includes a plurality of registers 815 for storing information associated with the control and status of the target interface logic 600 as a whole. Exemplary information stored in the global memory subspace 810 can include a software version and an operational status. Respectively comprising a plurality of registers 825, 845, the static pin memory subspaces 820, 840 are used to store configuration and/or status information for each input connection (or pin) 630, 640 (shown in FIGS. 3A-B) on a time-independent basis. The static pin memory (PSX) subspace 820 therefore can store configuration and/or status information for each of the emulator data input pins 630 on a time-independent basis; whereas, the static pin memory (PST) subspace 840 can be used to store configuration and/or status information for each of the target I/O pins 640 on a time-independent basis.

The dynamic pin memory subspaces 830, 850 respectively comprise a plurality of registers 835, 855 and are used to store configuration and/or status information for each input pin 630, 640 on a time-dependent basis. Thereby, the dynamic pin memory (PDX) subspace 830 can be used to store configuration and/or status information for each of the emulator data input pins 630 on a time-dependent basis. Configuration and/or status information for each of the target I/O pins 640 likewise can be stored in the dynamic pin memory (PDT) subspace 845 on a time-dependent basis. Essentially comprising a control store for the input pins 630, 640, the dynamic pin memory subspaces 830, 850 include information that is needed by the input pins 630, 640 for each target interface (or TIF) cycle.

As shown in FIG. 8, each memory subspace 810, 820, 830, 840, and 850 in the configuration memory space 800 can include auto-incrementing functionality. The auto-increment function can be provided in any conventional manner and preferably is provided in a manner that is reasonable in light of the functional characteristics of the relevant memory subspace 810, 820, 830, 840, and 850. For the dynamic memory subspaces 830, 850, for example, the auto-increment function can be at least partially temporally based; whereas, the auto-increment function for the static memory subspaces 820, 840 can be provided in a manner that increments across adjacent input pins 630, 640. As desired, the global memory subspace 810 can be auto-incremented across arbitrary addresses.

The various embodiments disclosed herein are susceptible to various modifications and alternative forms, and specific examples thereof have been shown by way of example in the drawings and are herein described in detail. It should be understood, however, that the various embodiments disclosed herein are not to be limited to the particular forms or methods disclosed, but to the contrary, the invention is to cover all modifications, equivalents, and alternatives falling within the spirit and scope of the claims.

What is claimed is:

1. A target interface logic for facilitating exchanges of communication signals between a hardware logic emulation system and a target system, the hardware logic emulation system having a plurality of programmable logic devices or processor chips, the target system verifying a logic design being emulated by the hardware logic emulation system, the target interface logic comprising:
    at least one control signal connection that receives a system clock signal and a synchronization signal from the hardware logic emulation system, said synchronization signal initiating an emulation cycle that comprises a predetermined number of system clock cycles of said system clock signal;
    a plurality of output data connections that receives output data signals from the hardware logic emulation system, said output data signals being dynamic during said emulation cycle;
    a plurality of input data connections that provides input data signals to the hardware logic emulation system, said input data signals being dynamic during said emulation cycle;
    a plurality of reconfigurable bidirectional connections that exchanges target data signals with the target system, said target data signals being dynamic during said emulation cycle;
    a plurality of field programmable gate arrays; and
    a configuration memory space storing configuration information,
    wherein at least one of the plurality of field programmable gate arrays is configured according to the configuration information to couple a first reconfigurable portion of the plurality of input data connections and a first reconfigurable portion of the plurality of reconfigurable bidirectional connections, and to couple a first reconfigurable portion of the plurality of output data connections and the first reconfigurable portion of the plurality of reconfigurable bidirectional connections,
    wherein the target interface logic reconfigurably schedules exchange of the target data signals between the hardware emulation logic and the target system according to the configuration information, and
    wherein at least one reconfigurable bidirectional connection of said reconfigurable bidirectional connections is configurable to change its configuration between providing outgoing target data signals and receiving incoming target data signals during said emulation cycle.

2. The target interface logic of claim 1, wherein said target interface logic stores at least one stored data value and wherein, during said first system clock cycle of said system clock cycles of said emulation cycle, said target interface logic processes said sampled output data signals and said at least one stored data value to provide said outgoing target data signals.

3. The target interface logic of claim 2, wherein said at least one stored data value includes a data value selected from a group consisting of a preselected fixed logic level and an output data signal sampled during a previous system clock cycle.

4. The target interface logic of claim 1, wherein said target interface logic stores at least one stored data value and wherein, during said first system clock cycle of said system clock cycles of said emulation cycle, said target interface logic processes said sampled target data signals and said at least one stored data value to provide said input data signals.

5. The target interface logic of claim 4, wherein said at least one stored data value includes a data value selected from a group consisting of a preselected fixed logic level and an output data signal sampled during a previous system clock cycle.

6. The target interface logic of claim 1,
    wherein, during a first system clock cycle of said emulation cycle, said target interface logic samples a first output data signal from a selected output data connection of the plurality of output data connections,
    wherein, during a second system clock cycle of said emulation cycle, said target interface logic samples a second output data signal from said selected output data connection of the plurality of output data connections, and
    wherein, during a third system clock cycle of said emulation cycle, said target interface logic provides said first and second output data signals to the target system via first and second reconfigurable bidirectional connections of the plurality of reconfigurable bidirectional connections respectively.

7. The target interface logic of claim 6, wherein said first and second system clock cycles comprise different clock cycles of said emulation cycle.

8. The target interface logic of claim 7, wherein said second system clock cycle is disposed between said first and third system clock cycles.

9. The target interface logic of claim 6, wherein said second and third system clock cycles comprise the same system clock cycle.

10. The target interface logic of claim 6, wherein said target interface logic stores said first output data signal.

11. The target interface logic of claim 1,
    wherein, during a first system clock cycle of said emulation cycle, said target interface logic samples first and second output data signals from first and second output data connections of the plurality of output data connections, respectively,
    wherein, during a second system clock cycle of said emulation cycle, said target interface logic provides said first output data signal to the target system via a selected reconfigurable bidirectional connection of the plurality of reconfigurable bidirectional connections, and
    wherein, during a third system clock cycle of said emulation cycle, said target interface logic provides said second output data signal to the target system via said selected reconfigurable bidirectional connection of the plurality of reconfigurable bidirectional connections.

12. The target interface logic of claim 11, wherein said second and third system clock cycles comprise different clock cycles of said emulation cycle.

13. The target interface logic of claim 12, wherein said second system clock cycle is disposed between said first and third system clock cycles.

14. The target interface logic of claim 11, wherein said second and third system clock cycles comprise the same system clock cycle.

15. The target interface logic of claim 11, wherein said target interface logic stores said second output data signal.

16. The target interface logic of claim 1, wherein said configuration memory space includes a memory subspace that stores said configuration information and status information for at least one of said output data connections and said reconfigurable bidirectional connections on a time-independent basis.

17. The target interface logic of claim 1, wherein said configuration memory space includes a memory subspace that stores said configuration information and status information for at least one of said output data connections and said reconfigurable bidirectional connections on a time-dependent basis.

18. The target interface logic of claim 1, wherein one of said bidirectional reconfigurable connections provides outgoing target data signals to the target system during said first system clock cycle of said system clock cycles of said emulation cycle and receives incoming target data signals from the target system during said second system clock cycle of said system clock cycles of said emulation cycle.

19. A communication system for exchanging communication signals, comprising:
a first system that provides a system clock signal, a synchronization signal, and output data signals and that receives input data signals, the first system having a plurality of programmable logic devices or processor chips, said synchronization signal initiating a system cycle that comprises a predetermined number of system clock cycles of said system clock signal; and
an interface logic that facilitates said exchanges of said communication signals with a second system verifying a logic design being emulated by the first system, and including:
at least one control signal connection that receives said system clock signal and said synchronization signal;
a plurality of output data connections that receives said output data signals, said output data signals being dynamic during said system cycle;
a plurality of input data connections that provides said input data signals, said input data signals being dynamic during said system cycle;
a plurality of reconfigurable bidirectional connections that exchanges bidirectional data signals with the second system, said bidirectional data signals being dynamic during said system cycle;
a plurality of field programmable gate arrays; and
a configuration memory space storing configuration information,
wherein at least one of the plurality of field programmable gate arrays is configured according to the configuration information to couple a first reconfigurable of the plurality of input data connections and a first reconfigurable portion of the plurality of reconfigurable bidirectional connections, and to couple a first reconfigurable portion of the plurality of output data connections and the first reconfigurable portion of the plurality of reconfigurable bidirectional connections,
wherein the target interface logic reconfigurably schedules exchange of the target data signals between the hardware emulation logic and the target system according to the configuration information, and
wherein at least one reconfigurable bidirectional connection of said reconfigurable bidirectional connections is configurable to change its configuration between providing outgoing target data signals and receiving incoming target data signals during said system cycle.

20. The communication system of claim 19, wherein said first system comprises a hardware logic emulation system.

21. The communication system of claim 20, wherein said second system comprises a target system.

22. The communication system of claim 20, wherein said system cycle comprises an emulation cycle.

23. A method for exchanging communication signals between a hardware logic emulation system and a target system, the hardware logic emulation system having a plurality of programmable logic devices or processor chips, the target system verifying a logic design being emulated by the hardware logic emulation system, the method comprising:
receiving a system clock signal and a synchronization signal from the hardware logic emulation system, said synchronization signal initiating an emulation cycle that comprises a predetermined number of system clock cycles of said system clock signal;
receiving output data signals from the hardware logic emulation system via a plurality of output data connections, said output data signals being dynamic during said emulation cycle;
providing input data signals to the hardware logic emulation system via a plurality of input data connections, said input data signals being dynamic during said emulation cycle;
exchanging target data signals with the target system via a plurality of reconfigurable bidirectional connections, said target data signals being dynamic during said emulation cycle;
configuring at least one of a plurality of field programmable gate arrays according to configuration information stored in a configuration memory space to couple a first reconfigurable portion of the plurality of input data connections and a first reconfigurable portion of the plurality of reconfigurable bidirectional connections, and to couple a first reconfigurable portion of the plurality of output data connections and the first reconfigurable portion of the plurality of reconfigurable bidirectional connections;
reconfigurably scheduling exchange of the target data signals between the hardware emulation logic and the target system according to the configuration information,
wherein at least one reconfigurable bidirectional connection of said reconfigurable bidirectional connections is configurable to change its configuration between providing outgoing target data signals and receiving incoming target data signals during said emulation cycle.

24. The method of claim 23,
further comprising:
sampling first and second output data signals from the plurality of output data connections during a first system clock cycle of said emulation cycle; and
providing said first and second sampled output data signals to a selected reconfigurable bidirectional connection of the plurality of reconfigurable bidirectional connections, said second sampled output data signal comprising a control signal and determining whether said selected reconfigurable bidirectional connection provides said first sampled output data signal to the target system during a second system clock cycle of said emulation cycle.

25. The method of claim 23,
further comprising:
sampling a first output data signal from a selected output data connection of the plurality output data connections during a first system clock cycle of said emulation cycle;

sampling a second output data signal from said selected output data connection of the plurality output data connections during said second system clock cycle of said emulation cycle, and providing said first and second sampled output data signals to a selected reconfigurable bidirectional connection of the plurality of reconfigurable bidirectional connections, said second sampled output data signal comprising a control signal and determining whether said selected reconfigurable bidirectional connection provides said first sampled output data signal to the target system during a third system clock cycle of said emulation cycle.

26. The method of claim 23, further comprising:

sampling an incoming first target data signal received via a selected reconfigurable bidirectional connection of the plurality of reconfigurable bidirectional connections during a first system clock cycle of said emulation cycle;

sampling an incoming second target data signal received via said selected reconfigurable bidirectional connection of the plurality of reconfigurable bidirectional connections during a second system clock cycle of said emulation cycle, and providing said first and second input data signals to the hardware logic emulation system via first and second input data connections of the plurality of input data connections during a third system clock cycle of said emulation cycle.

27. The method of claim 26, wherein said first and second system clock cycles comprise different clock cycles of said emulation cycle.

28. The method of claim 27, wherein said second system clock cycle is disposed in time between said first and third system clock cycles.

29. The method of claim 26, wherein said second and third system clock cycles comprise the same system clock cycle.

30. The method of claim 26, further comprising storing at least one of said sampled first and second output data signals.

31. The method of claim 27, further comprising:

sampling first and second incoming target data signals received via the plurality of bidirectional connections during a first system clock cycle of said emulation cycle;

providing said first sampled target data signal to the hardware logic emulation system via a selected input data connection of the plurality of input data connections during a second system clock cycle of said emulation cycle; and providing said second sampled target data signal to the hardware logic emulation system via said selected input data connection of the plurality of input data connections during a third system clock cycle of said emulation cycle.

32. The method of claim 31, wherein said second and third system clock cycles comprise different clock cycles of said emulation cycle.

33. The method of claim 32, wherein said second system clock cycle is disposed in time between said first and third system clock cycles.

34. The method of claim 31, wherein said first and second system clock cycles comprise the same system clock cycle.

35. The method of claim 31, further comprising storing at least one of said sampled first and second output data signals.

* * * * *